US010725872B2

(12) United States Patent
Tirado

(10) Patent No.: US 10,725,872 B2
(45) Date of Patent: Jul. 28, 2020

(54) RESTORE POINTS BASED ON MILESTONE VERSIONS

(71) Applicant: Hitachi Vantara LLC, Santa Clara, CA (US)

(72) Inventor: Margie Tirado, Westford, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 186 days.

(21) Appl. No.: 15/773,566

(22) PCT Filed: Dec. 14, 2015

(86) PCT No.: PCT/US2015/065496
§ 371 (c)(1),
(2) Date: May 4, 2018

(87) PCT Pub. No.: WO2017/105386
PCT Pub. Date: Jun. 22, 2017

(65) Prior Publication Data
US 2019/0034294 A1    Jan. 31, 2019

(51) Int. Cl.
*G06F 12/00*    (2006.01)
*G06F 11/14*    (2006.01)
*G06F 11/00*    (2006.01)

(52) U.S. Cl.
CPC ......... *G06F 11/1469* (2013.01); *G06F 11/00* (2013.01); *G06F 11/1448* (2013.01); *G06F 2201/835* (2013.01)

(58) Field of Classification Search
None
See application file for complete search history.

(56) References Cited

U.S. PATENT DOCUMENTS

| 8,005,797 | B1 | 8/2011 | Chepel et al. |
| 8,335,768 | B1 | 12/2012 | Desai et al. |
| 2006/0053334 | A1 | 3/2006 | Ingen et al. |
| 2007/0130232 | A1 | 6/2007 | Therrien et al. |
| 2008/0162590 | A1 | 7/2008 | Kundu et al. |
| 2008/0201391 | A1 | 8/2008 | Arakawa et al. |
| 2009/0132615 | A1 | 5/2009 | Shinozaki |
| 2009/0271605 | A1 | 10/2009 | Park et al. |
| 2012/0005176 | A1 | 1/2012 | Rao |

(Continued)

OTHER PUBLICATIONS

International Search Report of PCT/US2015/065496 dated Mar. 11, 2016.

*Primary Examiner* — Jason W Blust
(74) *Attorney, Agent, or Firm* — Mattingly & Malur, PC

(57) ABSTRACT

In some examples, a system may include multiple types of data restore point intervals, such as daily, weekly, monthly, etc. The system may store, for a first version of an object, a first time at which the object is received and a first flag for a first restore point interval. Subsequently, the system may store for a second version of the object, a second time at which the second object is received and a second flag for the first restore point interval. The system may clear a flag based on the second time and the first time being within a same time interval corresponding to the first restore point interval. An object version for which the flags have been cleared may be deleted from the storage. The stored times may be used to determine, at least partly, one or more retained object versions to provide for a selected restore point.

20 Claims, 18 Drawing Sheets

| Object ID | Timestamp | Replaced Time | Daily Flag | Weekly Flag | Monthly Flag |
|---|---|---|---|---|---|
| | | | | | |
| | | | | | |
| File 2, v2 | Sat 2015/01/17 14:00:00 | Sun. 2015/02/01 13:00:00 | True | True | True |
| File 1, v2 | Sun. 2015/01/18 11:00:00 | Wed. 2015/01/28 11:00:00 | | True | |
| File 3, v1 | Sun. 2015/01/18 11:00:00 | | True | True | True |
| | | | | | |
| | | | | | |
| | | | | | |
| | | | | | |
| File 1, v7 | Wed. 2015/01/28 13:03:00 | Sun. 2015/02/01 13:00:00 | True | | True |
| File 1, v8 | Sun. 2015/02/01 13:00:00 | | True | True | True |
| File 2, v3 | Sun. 2015/02/01 13:00:00 | | True | True | True |
| ⋮ | ⋮ | ⋮ | ⋮ | ⋮ | ⋮ |

Current Time: Wednesday, 2015/02/04 14:00:00

(56) References Cited

U.S. PATENT DOCUMENTS

| | | |
|---|---|---|
| 2012/0124306 A1 | 5/2012 | Abercrombie et al. |
| 2012/0158666 A1 | 6/2012 | Anglin et al. |
| 2014/0089264 A1* | 3/2014 | Talagala .................. G06F 3/065 707/649 |
| 2015/0012494 A1 | 1/2015 | Jewell |
| 2015/0142745 A1 | 5/2015 | Tekade et al. |
| 2015/0186487 A1 | 7/2015 | Karandikar |
| 2015/0347548 A1 | 12/2015 | Mortensen et al. |

* cited by examiner

Current Time: Sunday, 2015/01/18 11:00:00

| Object ID | Timestamp | Replaced Time | Daily Flag | Weekly Flag | Monthly Flag |
|---|---|---|---|---|---|
| File 1, v1 | Sat. 2015/01/17 13:00:00 | Sun. 2015/01/18 11:00:00 | True | | |
| File 2, v1 | Sat. 2015/01/17 13:00:00 | Sat. 2015/01/17 14:00:00 | | | |
| File 2, v2 | Sat. 2015/01/17 14:00:00 | | True | True | True |
| File 1, v2 | Sun. 2015/01/18 11:00:00 | | True | True | True |
| File 3, v1 | Sun. 2015/01/18 11:00:00 | | True | True | True |
| | | | | | |
| | | | | | |
| | | | | | |
| | | | | | |
| | | | | | |
| ... | ... | ... | ... | ... | ... |

FIG. 5

Current Time: WEDNESDAY, 2015/01/28 13:03:00

| OBJECT ID | TIMESTAMP | REPLACED TIME | DAILY FLAG | WEEKLY FLAG | MONTHLY FLAG |
|---|---|---|---|---|---|
| FILE 1, V1 | SAT. 2015/01/17 13:00:00 | SUN. 2015/01/18 11:00:00 | TRUE | | |
| FILE 2, V1 | SAT. 2015/01/17 13:00:00 | SAT. 2015/01/17 14:00:00 | | | |
| FILE 2, V2 | SAT. 2015/01/17 14:00:00 | | TRUE | | |
| FILE 1, V2 | SUN. 2015/01/18 11:00:00 | WED. 2015/01/28 11:00:00 | TRUE | TRUE | TRUE |
| FILE 3, V1 | SUN. 2015/01/18 11:00:00 | | TRUE | TRUE | TRUE |
| FILE 1, V3 | WED. 2015/01/28 11:00:00 | WED. 2015/01/28 13:00:00 | | TRUE | |
| FILE 1, V4 | WED. 2015/01/28 13:00:00 | WED. 2015/01/28 13:01:00 | | | |
| FILE 1, V5 | WED. 2015/01/28 13:01:00 | WED. 2015/01/28 13:02:00 | | | |
| FILE 1, V6 | WED. 2015/01/28 13:02:00 | WED. 2015/01/28 13:03:00 | | | |
| FILE 1, V7 | WED. 2015/01/28 13:03:00 | | TRUE | TRUE | TRUE |
| ... | ... | ... | ... | ... | ... |

FIG. 7

| | |
|---|---|
| 902 — Daily RP Retention | 7 Days |
| 904 — Weekly RP Retention | 4 Weeks |
| 906 — Monthly RP Retention | 12 Months |
| 908 — Earliest Daily Restore Point Date | Thu. 2015/01/15 9:00:00 |
| 910 — Earliest Weekly Restore Point Date | Thu. 2015/01/15 9:00:00 |
| 912 — Earliest Monthly Restore Point Date | Thu. 2015/01/15 9:00:00 |

| | |
|---|---|
| Daily RP Retention | 7 Days |
| Weekly RP Retention | 4 Weeks |
| Monthly RP Retention | 12 Months |
| Earliest Daily Restore Point Date | Wed. 2015/01/28 12:00:00 |
| Earliest Weekly Restore Point Date | Thu. 2015/01/15 9:00:00 |
| Earliest Monthly Restore Point Date | Thu. 2015/01/15 9:00:00 |

902 — Daily RP Retention
904 — Weekly RP Retention
906 — Monthly RP Retention
908 — Earliest Daily Restore Point Date
910 — Earliest Weekly Restore Point Date
912 — Earliest Monthly Restore Point Date

RESTORE POINTS BASED ON MILESTONE VERSIONS

TECHNICAL FIELD

This disclosure relates to the technical field of storage systems, including providing restore points for data.

BACKGROUND

Users may store user data as objects (e.g., files) in a storage system. As users change their objects, e.g., add or delete files, update files, and the like, the objects on the storage are changed to reflect the changes made by the users. Furthermore, users may want access to their objects as the objects existed at some point in time in the past. For instance, users may desire to access restore points of their data for a variety of reasons, such as in the case of accidental deletion of an object, corruption of an object, or the like. In such a case, a user may need to access a snapshot or other restore point of the user's data as it existed a point in time prior to the accidental deletion, corruption, etc.

Conventionally, taking a snapshot of user data entailed copying all of the contents of the user data at a point in time and storing the snapshot for future use. Snapshots may be taken at scheduled intervals, on demand, or based on various other techniques. However, taking snapshots in this manner consumes considerable computing resources and a large quantity of storage capacity.

Another conventional technique of taking snapshots includes saving metadata about what the system looks like at a particular time. According to this technique, a server may save a list of objects that exist at a particular time, but does not make copies of the content of the objects. Instead, the server prevents deletion or replacement of objects that are referenced by any snapshot metadata. This technique also has several drawbacks, such as consuming storage space for the metadata for each snapshot, consuming computing resources to generate the snapshot, and possibly maintaining numerous versions of the same object in the storage.

In both of the above-discussed conventional techniques of taking a snapshot, the actual snapshots themselves need to be generated, stored, managed, and eventually cleaned up. In addition, the data may be changing while the snapshot is being taken, which may present an additional challenge.

SUMMARY

Some implementations include techniques and arrangements for enabling restore points for user data based on one or more configurable restore point intervals without actually copying user data or indefinitely storing restore point metadata. Accordingly, multiple restore points may be enabled for a group of objects, such as in a file system or namespace. As one example, implementations herein are able to provide daily, weekly, and/or monthly restore points for data without making copies of the data, and are able to prune file versions without adversely affecting availability of the data for the multiple restore points.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates the example restore point data structure at a subsequent point in time according to some implementations.

FIG. 7 illustrates the example restore point data structure at a subsequent point in time according to some implementations.

FIG. 9 illustrates an example earliest daily, weekly, and monthly restore points according to some implementations.

FIG. 11 illustrates an example earliest daily, weekly, and monthly restore points according to some implementations.

DESCRIPTION OF THE EMBODIMENTS

Figure 1:
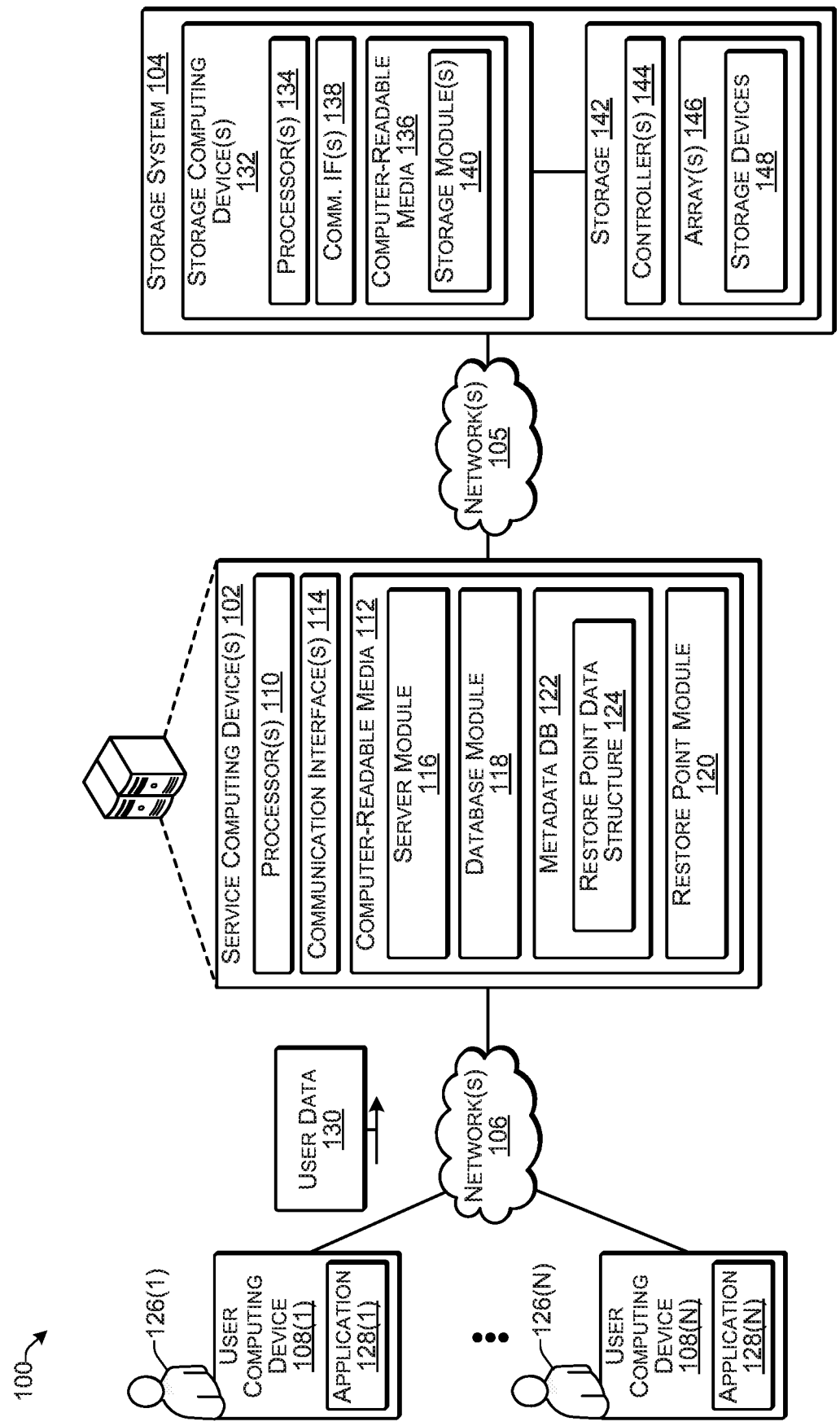
FIG. 1 illustrates an example architecture of a system configured to provide restore points for data according to some implementations.

Some implementations herein are directed to techniques and arrangements for establishing multiple restore points on a group of objects, such as a group of files. For instance, the group of files may correspond to a file system, folder, directory, namespace, or the like. The system herein may maintain a restore point data structure that may include restore point information for each of the files in the group of files. As one example, if a new version of a file is received, the system may check whether an older version of the file is to be retained for each of several different restore point intervals, such as for providing daily, weekly, and monthly restore points, or other desired intervals. Versions of a file that do not correspond to any currently maintained restore points may be designated for permanent deletion.

Some examples herein are able to provide daily, weekly, and monthly restore point snapshots without saving snapshot copies of the data. For instance, the daily versions may be maintained for a configurable number of days, the weekly versions may be maintained for a configurable number of weeks, and the monthly versions may be maintained for a configurable number of months. Thus, implementations herein may generate periodic restore points of data that is continually changing without actually making copies of the data at any point. For example, restore point metadata about objects may be stored in the restore point data structure, and may be used to generate periodic historic views into what the data looked like at particular points in time in the past. Accordingly, computing and storage resources are conserved and restore points are provided (a) without iterating over the data at any point to generate a snapshot, (b) without consuming a large quantity of storage space to store data or metadata for a snapshot, (c) without storing all versions of the data, or (d) without storing a snapshot of the data as a separate entity. Furthermore, while this description may use the term "file" instead of "object" for clarity in some examples, the description herein applies to other types of objects and data sets as well, and not just to files.

Some examples provide restore points by storing, in the restore point data structure, a received time timestamp with a respective entry for each version of an object. When an object is updated to a newer version, a replaced time may also be added to the entry for an immediately earlier version. Further, in the restore point data structure, object versions may be flagged as milestone versions as the object versions are stored, and the flags on older versions may be cleared as entries for newer versions of the same object are added or as the older versions age out of restore points based on configurable retention periods. Accordingly, implementations herein ensure that the object versions corresponding to specified restore points and restore point intervals are not deleted until they have been replaced and/or aged out. Thus, users may be able to browse the versions of an object that existed at the different restore point intervals.

As one example, prior to starting automatic enablement of the restore points, an administrator or other user may initially determine one or more desired intervals for restore points, e.g., daily, weekly, monthly, etc. The selected intervals may be any time period, but are typically selected prior to beginning the storage of metadata to enable restore points, and may be referred to herein as milestone restore point intervals. The administrator or other user may further determine a length of time that restore point versions will be made available for each restore point interval. As an example, daily restore points may be made available for 7 days, weekly restore points may be made available for 4 weeks, and monthly restore points may be made available for 12 months. These values may be configurable and may be changed at will by an administrator or other user having sufficient permission status. Further, while daily, weekly, and monthly restore point intervals are described in the examples herein, other restore point intervals may be used, such as hourly, half-day, bi-daily, bi-weekly, semi-annually, yearly, or any other desired interval.

Following determination of the restore point intervals and the retention periods for each of the restore point intervals, the system may generate restore points when a file is added or updated in a dataset by storing metadata about the file in the restore point data structure. For instance, suppose that a user adds a new file to a dataset. In response, the system may add, to the restore point data structure, an entry for the new file that includes a path of the file, or other file identifier, and the current time at which the new file is added to the data set, referred to as a timestamp. In addition, the entry in the restore point data structure may include flags (which may be Boolean indicators) that indicate that the new file is a milestone version for all of the configured milestone intervals. For example, if using daily, weekly, and monthly milestones, the new file is flagged as a daily, weekly, and monthly milestone version of that file. Further, as one example, restore points may correspond to the end of a day (i.e., midnight) for daily restore points, end of the week (i.e., Sunday night) for weekly restore points, and end of month (i.e., the last day of the month) for monthly restore points, although other interval end times may be used in other examples.

Subsequently, suppose that the user stores an updated second version of the file to the storage. In response, the system adds a new entry to the restore point data structure that includes information about the second version of the file. The new entry includes the identifier of the second version of the file (e.g., the path) and the timestamp for the second version of the file. Further, in the new entry in the data structure, the flags are all set to true for daily, weekly, and monthly. In addition, in the earlier entry in the restore point data structure for the first version of the file, the system adds the current time as the replaced time. Thus, the replaced time is the time that first version of the file is replaced by the second version. Further, if the second version is added during a current milestone, then the milestone version flags are cleared as appropriate from the earlier entry. For example, if using daily, weekly, and monthly milestones, then the following occurs for the first version of the file:

If the second version of the file is added on the same day as the first version of the file, then the daily flag is cleared from the first entry; otherwise, the daily flag is not cleared.

If the second version of the file is added during the same week as the first version of the file then the weekly flag is cleared from the first entry; otherwise, the weekly flag is not cleared.

If the second version of the file is added during the same month as the first version of the file, then the monthly flag is cleared from the first entry; otherwise, the monthly flag is not cleared.

As additional updates are made to the file, additional entries are added to the restore point data structure by repeating the operations set forth above. Furthermore, when a file is deleted from the dataset, the previous version's replaced time is set to the current time, and the deleted file will eventually age out based on the retention settings. In addition, periodically, the milestone flags are cleared in the restore point data structure for entries corresponding to old versions. For instance, as old milestone versions age out of restore points based on the configurable retention periods, the milestone flags for those entries are cleared. When all the flags for an entry are cleared, the entry may be removed from the data structure and the corresponding file version may be deleted permanently from the storage.

The system may also record the latest date before which the milestone versions are cleared. For example, if the system is configured to make daily restore points available for seven days, then any files that were replaced more than seven days ago will have their daily flag cleared. The system records the date of seven days ago as the earliest available daily restore point date if the current value of earliest available daily restore point date is earlier than seven days ago. If weekly restore points are specified to be made available for four weeks, then any versions that were replaced more than four weeks ago will have their weekly flag cleared. The system records the earliest available weekly restore point date as the date of four weeks ago, assuming it was previously set to earlier than four weeks ago. Similarly, if monthly restore points are specified to be available for one year, then any versions that were replace more than 12 months ago will have their monthly flag cleared. The system records the earliest available monthly restore point date as the date of 12 months ago, assuming it was previously set to earlier than 12 months ago.

Any entries for versions that do not have any milestone flags set on them can be removed from the system at any time to save space. For example, a service may run periodically to remove entries from the restore point data structure and further to send an indication to a storage that maintains the corresponding objects to indicate that those objects may be permanently deleted from the storage. On the other hand, if an entry in the restore point data structure for a particular version has any milestone flag set on it, then that version is not deleted from the storage until after such a time that all the flags are cleared from the corresponding entry in the data structure.

The above techniques enable a user to be presented with a list of restore point dates that can be easily generated on the fly. The list of restore points dates for milestone intervals may include all dates which (1) are later than the earliest available restore point date for the milestone interval; (2) are earlier than the current interval (e.g., not today if using daily intervals); and (3) fall on the interval period. For example, suppose that the system is configured for daily and monthly restore points, and that the current date is Jul. 4, 2015. If the earliest daily restore point date is set to Jul. 1, 2015, then the available daily restore points would be Jul. 1, 2015, Jul. 2, 2015, and Jul. 3, 2015. If the earliest available monthly restore point date is May 15, 2015, then the available monthly restore point dates would be May 31, 2015, and Jun. 30, 2015.

The system herein may further provide a user interface to enable a user to select restore points from a list of available restore points. After the user selects a restore point from the list of available restore points, the system determines the files that were present according to that restore point by simply selecting all versions whose timestamp is earlier than the time of the selected restore point, and whose replaced time is either null (meaning the version has not yet been replaced), or later than or equal to the restore point time.

Further, restore point intervals and retention periods may be established based on various different levels of granularity, such as for particular users, a group of file systems, a group of folders, a particular file system, a particular folder, a group of objects, a particular object, or the like. For instance, if the restore point intervals or retention periods are changed for a particular folder, the corresponding restore point data structure may be updated accordingly. As one example, suppose that a user's private folder includes one or more files stored according to a first set of restore point intervals and retention periods. Subsequently, suppose that the folder is transitioned to a team folder, and that a different set of restore point intervals and retention periods applies to team folders. Accordingly, the restore point data structure for the folder may be updated to correspond to the newly applicable restore point intervals and retention periods, such as by clearing flags, removing entries in the restore point data structure, etc.

For discussion purposes, some example implementations are described in the environment of computing system having one or more computing nodes in communication with a storage system. However, implementations herein are not limited to the particular examples provided, and may be extended to other types of computing systems, other types of storage environments, other system architectures, and so forth, as will be apparent to those of skill in the art in light of the disclosure herein.

FIG. 1 illustrates an example architecture of a system 100 configured to provide restore points for data according to some implementations. The system 100 includes a least one service computing device 102, also referred to herein as a node, that is able to communicate with, or is otherwise coupled to, a storage system 104, such as through one or more networks 105. Further, the service computing device 102 may be able to communicate over one or more networks 106 with one or more user computing devices 108, such as user devices 108(1)-108(N), or other types of client devices.

In some examples, the service computing device 102 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the service computing device 102 includes, or may have associated therewith, one or more processors 110, one or more computer-readable media 112, and one or more communication interfaces 114.

Each processor 110 may be a single processing unit or a number of processing units, and may include single or multiple computing units or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. For instance, the processor(s) 110 may be one or more hardware processors and/or logic circuits of any suitable type specifically programmed or configured to execute the algorithms and processes described herein. The processor(s) 110 can be configured to fetch and execute computer-readable instructions stored in the computer-readable media 112, which can program the processor(s) 110 to perform the functions described herein.

The computer-readable media 112 may include volatile and nonvolatile memory and/or removable and non-removable media implemented in any type of technology for storage of information, such as computer-readable instructions, data structures, program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the service computing device 102, while in other examples, the computer-readable media 112 may be partially remote from the service computing device

102. For instance, in some cases, the computer-readable media 112 may include a portion of storage in the storage system 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the service computing device 102. Functional components stored in the computer-readable media 112 may include a server module 116, a database module 118 and a restore point module 120, each of which may include one or more computer programs, applications, executable code, or portions thereof. For example, the server module 116 may provide communication functionality with the user computing devices 108 and the storage system 104. The database module 118 may include a database management program, for creating and managing a metadata database 122 containing metadata corresponding to user data stored at the storage system 104. The restore point module 120 may include algorithms and code described herein for enabling and managing the data restore points, which may include generation and management of a restore point data structure 124, either directly, or as part of the metadata database 122. For example, the restore point module 120 may be configured to provide instructions to the database module 118 to cause the database module 118 to maintain the restore point data structure 124 as part of the metadata database 122. Alternatively, in other examples, the restore point data structure 124 may be maintained separate from the metadata database-122. Additional functional components stored in the computer-readable media 112 may include an operating system (not shown in FIG. 1) for controlling and managing various functions of the service computing device 102. In some cases, the functional components may be stored in a storage portion of the computer-readable media 112, loaded into a local memory portion of the computer-readable media 112, and executed by the one or more processors 110.

In addition, the computer-readable media 112 may store data and data structures used for performing the functions and services described herein. For example, the computer-readable media 112 may store the metadata database 122 and the restore point data structure 124. In the illustrated example, the restore point data structure 124 is included in the metadata database 122; however, in other examples, the restore point data structure 124 may be maintained separately from the metadata database 122. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The communication interface(s) 114 may include one or more interfaces and hardware components for enabling communication with various other devices, such as over the network(s) 105 and 106. Thus, the communication interfaces 114 may include, or may couple to, one or more ports that provide connection to the network(s) 105 for communicating with the storage system 104, and one or more ports that provide connection to the network(s) 106 for communication with the user devices 108. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each user computing device 108 may be any suitable type of computing device such as a desktop, laptop, tablet computing device, mobile device, smart phone, wearable device, or any other type of computing device able to send data over a network. In some cases, the user computing devices 108 may include hardware configurations similar to that described for the service computing device 102, but with different data and functional components to enable them to perform the various functions discussed herein. Users 126(1)-126(N) may be associated with respective user devices 108(1)-108(N), such as through a user account, user login credentials, or the like. In some examples, the user devices 108 may access the service computing device 102 via an application server (not shown in FIG. 1), while in other examples, the user devices 108 may access the service computing device 102 directly. Furthermore, the user devices 108 may be able to communicate with the service computing device 102 through the one or more networks 106, through separate networks, or through any other suitable type of communication connection. Numerous other variations will be apparent to those of skill in the art having the benefit of the disclosure herein.

Further, each user device 108(1)-108(N) may include a respective instance of an application 128(1)-128(N) that may execute on the respective user device 108(1)-108(N), such as for sending user data 130 to the service computing device 102 for storage on the storage system 104. The user application 128 may generate the user data 130 and/or may save the user data 130 to the storage system 104, such as by sending the user data 130 to the service computing device 102. Further, in some examples, the user data 130 may include content items, such as images, documents, emails, video recordings, audio recordings, and the like. In some cases, the application 128 may include a browser or may operate through a browser, while in other cases, the application 128 may include any other type of application having communication functionality enabling communication over the one or more networks 106 with the server module 116.

The one or more networks 105 and 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 105 and 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102 and user devices 108 are able to communicate over the one or more networks 106 using wired or wireless connections, and combinations thereof. Further, in some cases, a load balancing computing device (not shown in FIG. 1) may be located between the service computing device 102 and the user computing devices 108. Additionally, in some examples, the network 105 may be a LAN and the service computing device 102 and the storage system 104 may be located locally to each other.

The storage system 104 may include one or more storage computing devices 132, which may include one or more servers or any other suitable computing device, such as any of the examples discussed above with respect to the service computing device 102. The storage computing device(s) 132 may each include one or more processors 134, one or more computer-readable media 136, and one or more communication interfaces 138. For example, the processors 134 may correspond to any of the examples discussed above with respect to the processors 110, the computer-readable media 136 may correspond to any of the examples discussed above with respect to the computer-readable media 112, and the communication interfaces 138 may correspond to any of the examples discussed above with respect to the communication interfaces 114.

In addition, the computer-readable media 136 may include one or more storage modules 140 as functional components executed by the one or more processors 134 for managing the storage of data on a storage 142 included in the storage system 104. The storage 142 may include one or more controllers 144 associated with the storage 142 for storing data on one or more arrays 146 of storage devices 148. For instance, the controller 144 may control the array 146, such as for configuring the array 146 in a RAID configuration, for the like, and/or for presenting logical units based on the storage devices 148 to the storage module 140, and for managing data stored on the underlying physical storage devices 148. The storage devices 148 may be any type of storage device, such as hard disk drives, solid state drives, optical drives, magnetic tape, and so forth. In some examples, the one or more arrays 146 may include a thin-provisioning array configured to provide on-demand storage capacity.

As discussed above, when a user device 108 stores user data 130, such as an updated file, the service computing device 102 may receive the user data 130 from the client device 108 for storage at the storage system 104. In addition to storing other metadata about the updated file, such as file path, file name, file size, file type, and the like, the restore point module 120 may cause creation of metadata for a restore point corresponding to the updated file. Thus, the restore point module 120 may cause creation of a new entry in the restore point data structure 124 that corresponds to the updated file. The creating the entry may include adding a timestamp and setting of the flags for each of the specified intervals (e.g., daily, weekly, monthly). Further, if there is a previous entry for an earlier version of the file, the current time is added to the previous entry as the replaced time. In addition, if the updated file is received during the same day, same week, and/or same month as the previous version of the file, then the corresponding flag in the previous entry is cleared. Additional details of creation and management of the restore point data are discussed below with respect to FIGS. 3-16.

Figure 2:
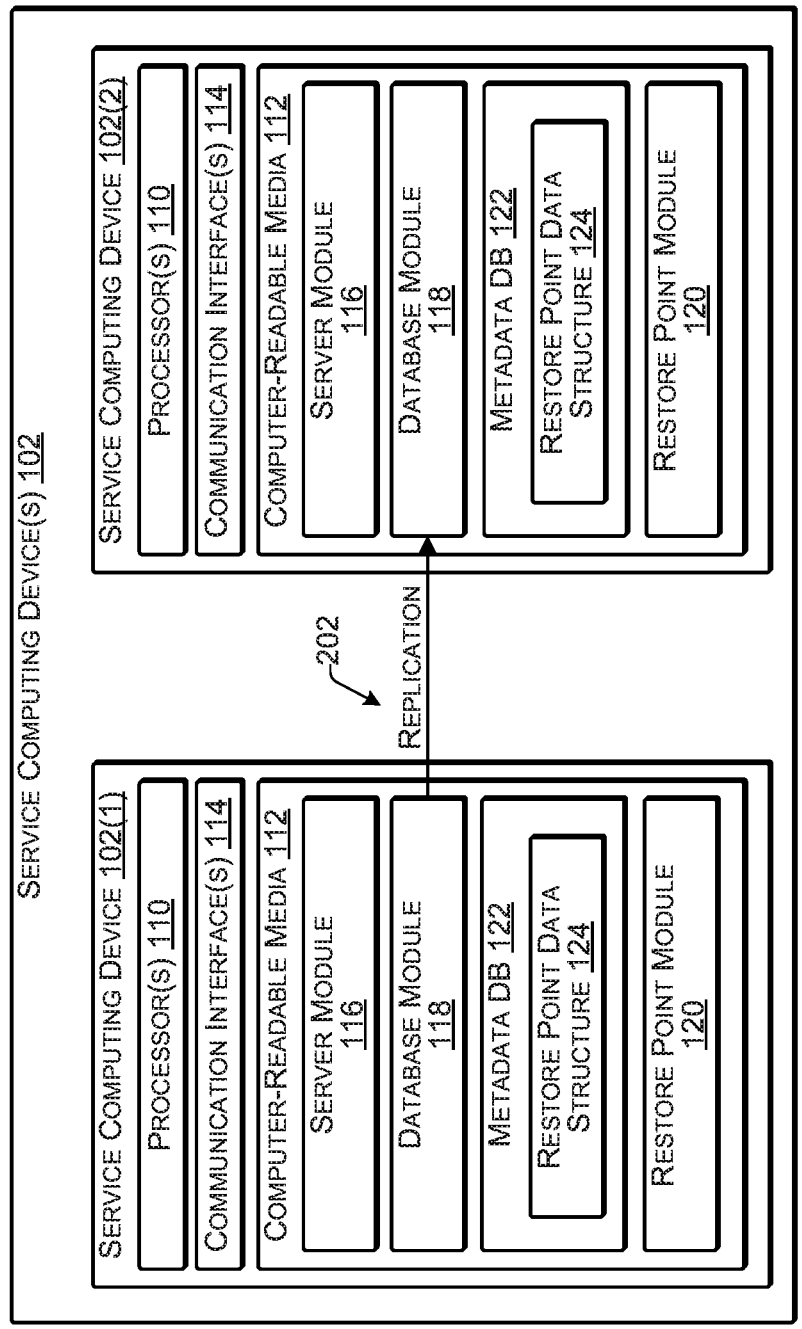
FIG. 2 illustrates an example configuration of the service computing devices according to some implementations.

FIG. 2 illustrates one possible example configuration 200 of the one or more service computing device(s) 102 according to some implementations. In the example configuration 200, a first service computing device 102(1) may be coupled to a second service computing device 102(2). For example, the first service computing device 102(1) and second service computing device 102(2) may together form a computing pod for providing storage and data management services to a plurality of the user computing devices 108 (not shown in FIG. 2). In some examples, the first service computing device 102(1) may act as a master or primary computing device, while the second service computing device 102(2) may act as a slave or secondary computing device, at least with respect to maintaining the metadata database 122. For instance, the server modules 116 on both service computing devices 102(1) and 102(2) may receive communications from users and write to the metadata database 118 on the computing device 102 serving in the primary role. Thus, when the first service computing device 102(1) is acting as the primary computing device, database module 118 on the first service computing device 102(1) may update and maintain the metadata database 122 on the first service computing device 102(1) for transactions performed by the server modules 116 on both the first service computing device 102(1) and the second service computing device 102(2). Furthermore, the restore point module 120 on the first service computing device 120(1) may cause the creation of the restore point data structure 124 and may manage updating of the restore point data structure 124 as changes are made to the user data.

The database module 118, or other module, on the first service computing device 102(1) may replicate the metadata database 122 to the second service computing device 102(2), as indicated at 202. Accordingly, the second service computing device 102(2) may maintain a replica of the metadata database 122, which may include a replica of the restore point data structure 124. Alternatively, in the examples in which the restore point data structure 124 is maintained separate from the metadata database 122, the restore point module 120, or other suitable module, on the first service computing device 102(1) may replicate the restore point data structure 124 to the second service computing device 102(2). Should the first service computing device 102(1) suffer a failure, the second service computing device 102(2) may assume the role of primary computing device while the first service computing device 102(1) is replaced with a different service computing device (not shown in FIG. 2) and/or repaired. Furthermore, the example of FIG. 2 is just one example of a possible configuration of the one or more service computing devices 102. Numerous other configurations will be apparent to those of skill in the art having the benefit of the disclosure herein.

Figure 3:
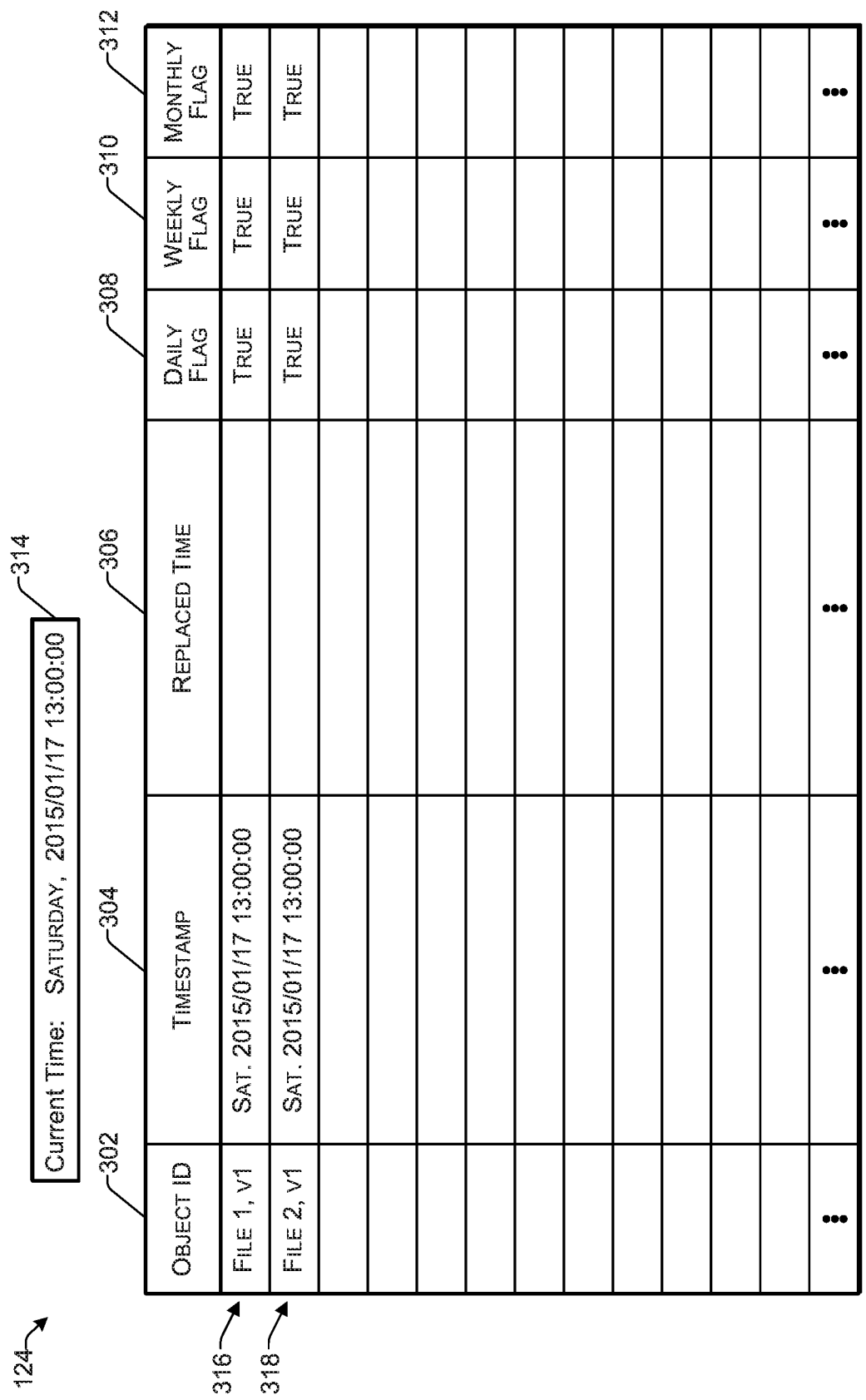
FIG. 3 illustrates an example restore point data structure at a first point in time according to some implementations.

FIG. 3 illustrates an example of the restore point data structure 124 according to some implementations. For instance, the restore point data structure 124 may be maintained, at least in part, by the restore point module 120 (not shown in FIG. 3) and may be used for enabling and managing restore points for user data. In the illustrated example, the restore point data structure 124 includes an object ID 302, a timestamp 304, a replaced time 306, a daily flag 308, a weekly flag 310, and a monthly flag 312. For instance, the object ID 302 may be the path of the object in the storage system, or any other suitable object identifier such as an assigned unique object name, a hash of the object path, or the like. The timestamp 304 may be a time at which the object is received for storage in the storage system. Accordingly, as one example, the timestamp 304 may be generated based on the current time when the object is received from the user computing device for storage in the storage system.

The replaced time 306 may be the time at which a new version of an object is received for storage in the storage system. For example, when there is only one version of an object stored in the storage system, then the replaced time is null since the object version has not been replaced. When a new version of the object is received for storage in the storage system, the replaced time is added to an entry for the immediately previous version of the object that is being replaced with the newer version. In the examples herein, the replaced time corresponds to the timestamp used for the newer version of the object.

The daily flag 308, weekly flag 310, and monthly flag 312 may be Boolean indicators used to track the milestone versions of an object. For instance, when a new version of an object is added to the restore point data structure 124, the new version becomes the milestone version of the object for all three of the daily interval, weekly interval, and monthly interval. Accordingly, the daily flag 308, weekly flag 310, and monthly flag 312 may be set by receiving a Boolean indicator to indicate that the entry corresponds to a milestone version, i.e., a version that is to be used for a restore point for the corresponding interval. Furthermore, in other examples, other flags for different intervals may be used rather than daily, weekly, and/or monthly, depending on the interval(s) desired for establishing restore points.

In addition, a current time 314 may be used by the restore point module when updating the restore point data structure 124. For example, the current time may be determined based on a clock associated with the processor(s) of the service computing device or by any other suitable means. In the example of FIG. 3, the current time is Saturday, Jan. 17, 2015, at 1:00 PM, i.e., 13:00 hours. Furthermore, in this example, suppose that a new empty data set was created on Thursday, Jan. 15, 2015, at 9:00 AM.

In this example, suppose that the service computing device receives, from a user computing device, a first version of a first file (file 1, v1), and a first version of a second file (file 2, v1) for storage on the storage system, and that there are no earlier version's of these files or other files in the data set. In response to receiving file 1, v1, and file 2, v1 for storage, the restore point module may create a first entry 316 in the restore point data structure 124 for file 1, v1, and a second entry 318 for file 2, v1. For example, the restore point module may send a command to the database module, such as using SQL (Structured Query Language) or any other suitable form of instruction to create the first entry 316 and the second entry 318. Accordingly, the first entry 316 includes a file identifier for file 1, v1 at 302, the current time in the timestamp 304, the replaced time 306 is null, and the daily flag 308, weekly flag 310, and monthly flag 312 are all set to "true" to indicate that the corresponding version of file 1, v1 is a milestone version that is to be retained as a restore point for a daily restore point, a weekly restore point, and a monthly restore point, respectively. Similar information is entered for file 2, v1 in the second entry 318.

Figure 4:
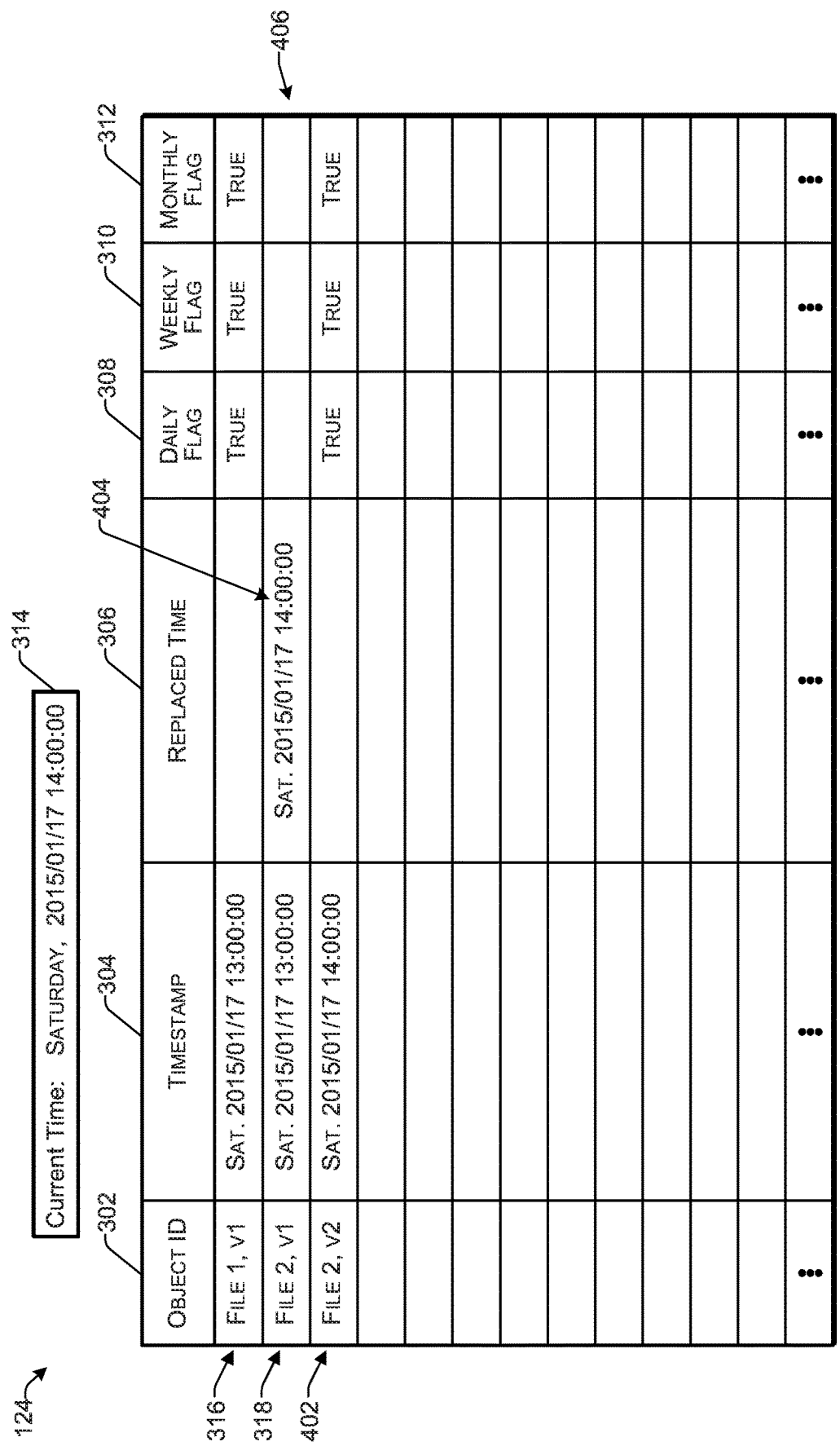
FIG. 4 illustrates the example restore point data structure at a subsequent point in time according to some implementations herein.

FIG. 4 illustrates the example of the restore point data structure 124 at a subsequent point in time according to some implementations. In this example, suppose that the current time is now Saturday, Jan. 17, 2015, at 2:00 PM, i.e., 14:00 hours, which is one hour later than the time in the example of FIG. 3. Furthermore, suppose that the user has updated file 2 by saving a second version of file 2 (file 2, v2) to the storage system at the current time. As one example, the new version may have a different path in the storage system from the first version, although the path may appear to be the same to the user. Alternatively, the new version may have the same path as the first version, and the path of the first version may be changed, or any other suitable technique may be used for maintaining both the first version and the second version of file 1 in the storage system, without the second version overwriting the first version.

In response, the restore point module may create a new entry 402 in the restore point data structure 124 for the second version of file 2 (file 2, v2). Accordingly, the entry 402 includes the object ID 302 for file 2, v2, the timestamp 304, which is the current time, and the daily flag 308, weekly flag 310, and monthly flag 312 are all set to true. In addition, as indicated at 404, the current time is added as the replaced time in the earlier entry 318 for the first version of file 2 (file 2, v1). Furthermore, as indicated at 406, the daily flag 308, weekly flag 310, and monthly flag 312 are all cleared for the earlier entry 318 since the second version of file 2 is received for storage on the same day, same week, and same month as the first version of file 2 (file 2, v1) corresponding to the earlier entry 318.

FIG. 5 illustrates the example restore point data structure 124 at a subsequent point in time according to some implementations. In this example, suppose that the current time now is Sunday, Jan. 18, 2015, at 11 AM, which is the next day after the examples of FIGS. 3 and 4. Furthermore, suppose that the user has updated file 1 by saving a second version of file 1 (file 1, v2) to the storage system at the current time, and has also saved a new third file (file 3, v1).

In response, the restore point module may create a new entry 502 in the restore point data structure 124 for the second version of file 1 (file 1, v2). Accordingly, the entry 502 includes the object ID 302 for file 1, v2, the timestamp 304, which is the current time, and the daily flag 308, weekly flag 310, and monthly flag 312 are all set to true. In addition, as indicated at 504, the current time is added as the replaced time 306 in the earlier entry 316 for the first version of file 1 (file 1, v1). Furthermore, as indicated at 506 and 508, respectively, the weekly flag 310, and monthly flag 312 are cleared for the earlier entry 316 since the second version of file 1 is stored on the same week and same month as the first version of file 1 (file 1, v1) corresponding to the earlier entry 316. However, as indicated at 510, the daily flag 308 is not cleared since the second version of file 1 (file 1, v2) is received for storage on a different day from the first version of file 1 (file 1, v1).

In addition, the restore point module creates a new entry 512 for the new third file (file 3, v1), which includes the current time as the timestamp 304, null for the replaced time, and the daily flag 308, weekly flag 310, and monthly flag 312 all set to true.

Figure 6:
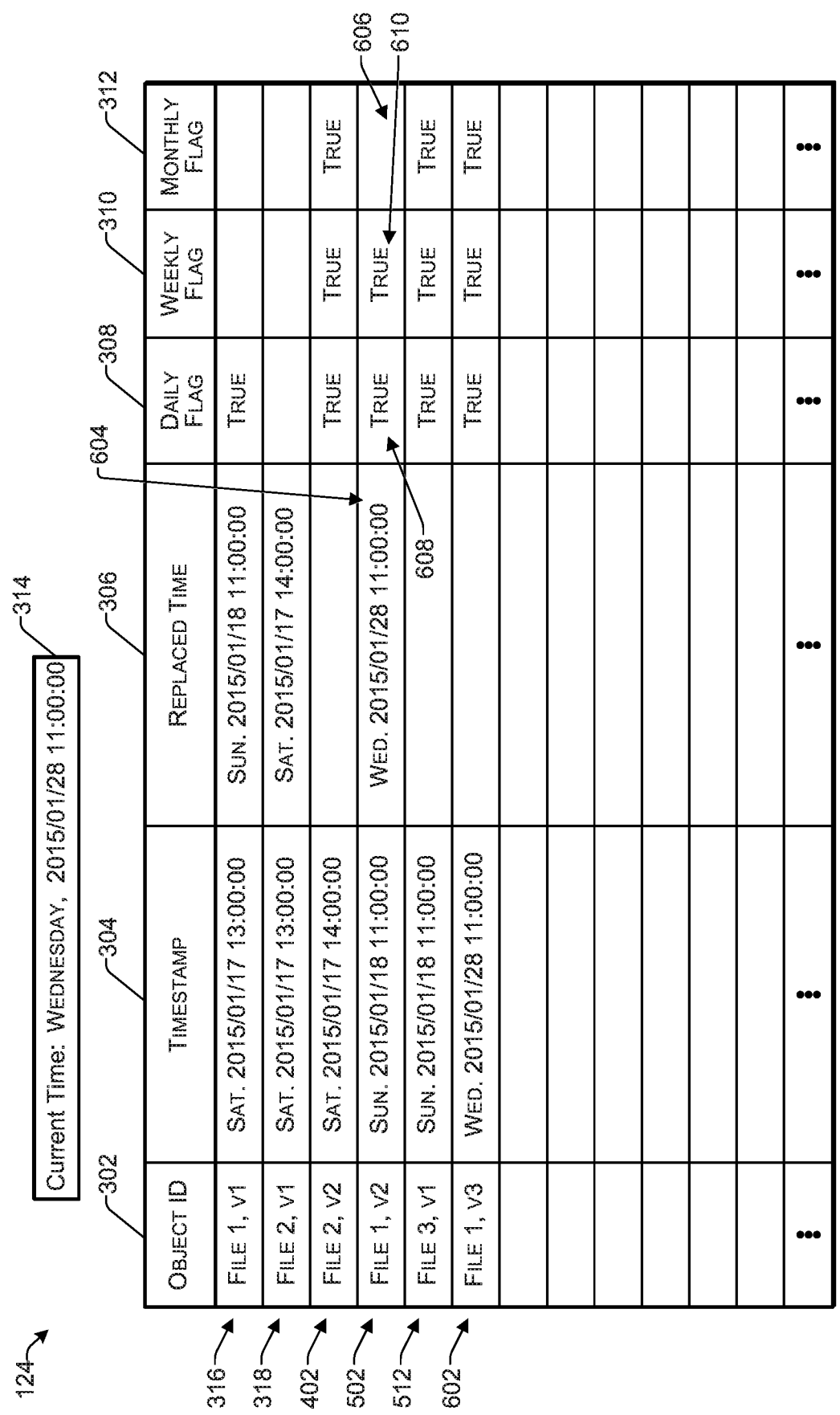
FIG. 6 illustrates the example restore point data structure at a subsequent point in time according to some implementations.

FIG. 6 illustrates the example restore point data structure 124 at a subsequent point in time according to some implementations. In this example, suppose that the current time now is Wednesday, Jan. 28, 2015, at 11 AM, which is a different week from the examples of FIGS. 3, 4 and 5. For example, as mentioned above, in the examples herein, days may end at midnight, weeks may end Sunday at midnight, and months may end on the last day of the month at midnight. Of course, alternative end times for each interval may be used as long as there is a consistency of use. Furthermore, in this example, suppose that the user has updated file 1 by saving a third version of file 1 (file 1, v3) to the storage system at the current time.

In response, the restore point module may create a new entry 602 in the restore point data structure 124 for the third version of file 1 (file 1, v3). Accordingly, the entry 602 includes the object ID 302 for file 1, v3, the timestamp 304, which is the current time, and the daily flag 308, weekly flag 310, and monthly flag 312 are all set to true. In addition, as indicated at 604, the current time is added as the replaced time 306 in the immediately preceding entry 502 for the second version of file 1 (file 1, v2). Furthermore, as indicated at 606, the monthly flag 312 is cleared for the earlier entry 502 since the third version of file 1 (file 1, v3) is stored during the same month as the second version of file 1 (file 1, v2) corresponding to the earlier entry 502. However, as indicated at 608 and 610, respectively, the daily flag 308 and the weekly flag 310 are not cleared since the third version of file 1 (file 1, v3) is stored during a different day and different week from the second version of file 1 (file 1, v2).

FIG. 7 illustrates the example restore point data structure 124 at a subsequent point in time according to some implementations. In this example, suppose that the current time now is Wednesday, Jan. 28, 2015, at 1:03 PM, i.e., 13:03 hours, which is a different week from the examples of FIGS. 3, 4, and 5, but the same day as the example of FIG. 6. In this example, suppose that the user has updated file 1 by saving a fourth version of file 1 (file 1, v4) to the storage system at 1:00 PM, a fifth version of the file 1 (file 1, v5) at 1:01 PM, a sixth version of file 1 (file 1, v6) at 1:02 PM, and a seventh version of file 1 (file 1, v7) at the current time, 1:03 PM.

In response, the restore point module may create a new entry 702 in the restore point data structure 124 for the fourth version of file 1 (file 1, v4); a new entry 704 for the fifth version of file 1 (file 1, v5); a new entry 706 for the sixth version of file 1 (file 1, v6); and a new entry 708 for the seventh version of file 1 (file 1, v7). Accordingly, each entry 702-708 includes the respective object ID 302 for that version of file 1 and the respective timestamp 304, which is the time at which that version was saved. In addition, and the daily flag 308, weekly flag 310, and monthly flag 312 are cleared for entries 602 and 702-706 since entry 708 is for a version that was saved on the same day, same week and same month as the versions represented by entries 602 and 702-706. In addition, the replaced time 306 for each of entries 602 and 702-706 is the timestamp of the immediately subsequent version of file 1.

Figure 8:
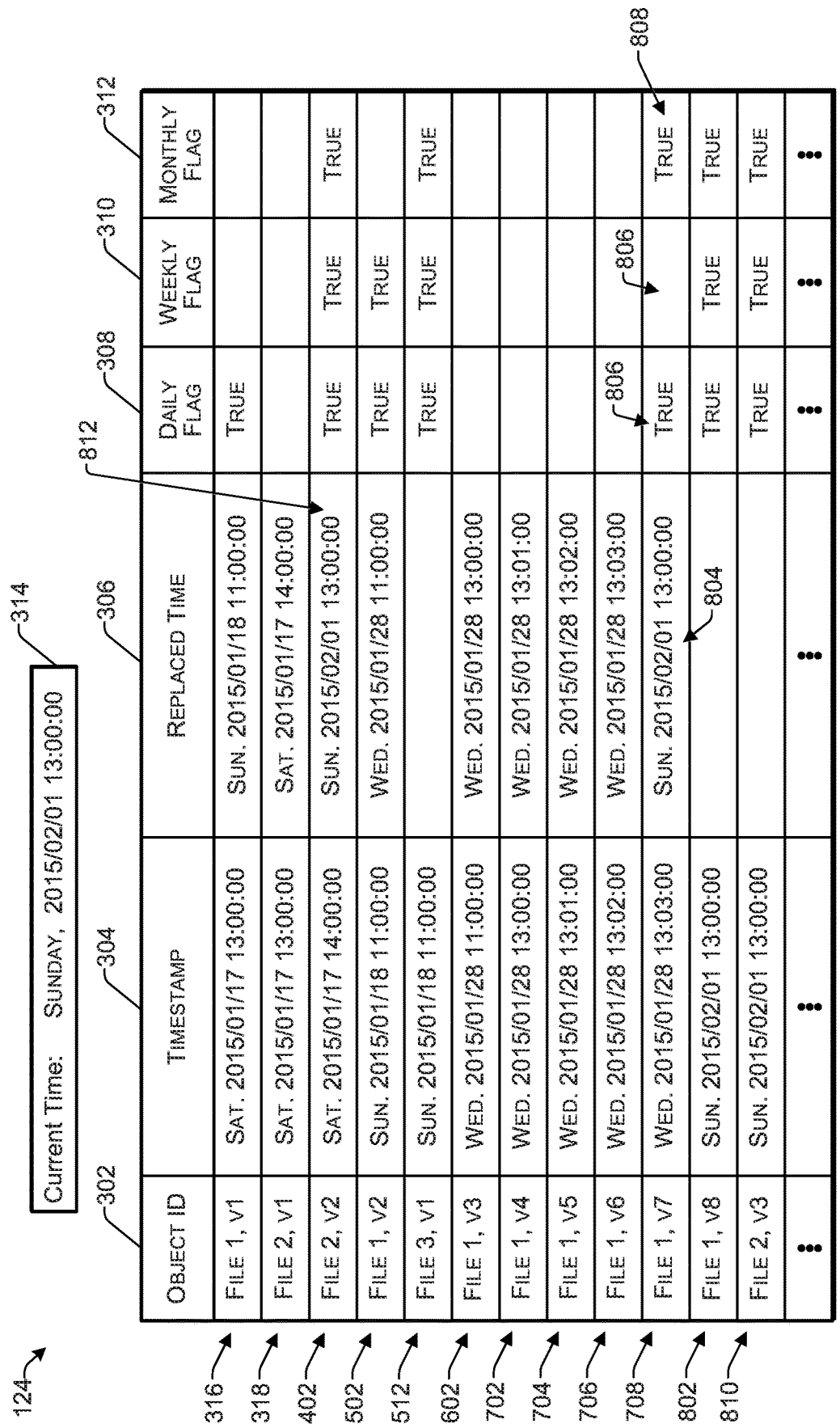
FIG. 8 illustrates the example restore point data structure at a subsequent point in time according to some implementations.

FIG. 8 illustrates the example restore point data structure 124 at a subsequent point in time according to some implementations. In this example, suppose that the current time now is Sunday, Feb. 2, 2015, at 1:00 PM, i.e., 1300 hours, which is the same week as the example of FIG. 7, but a different month and day. Furthermore, in this example, suppose that the user has updated file 1 by saving an eighth version of file 1 (file 1, v8) and a third version of file 2 (file 2, v3) to the storage system at the current time.

In response, the restore point module may create a new entry 802 in the restore point data structure 124 for the eighth version of file 1 (file 1, v8). Accordingly, the entry 802 includes the object ID 302 for file 1, v8, the timestamp 304, which is the current time, and the daily flag 308, weekly flag 310, and monthly flag 312 are all set to true. In addition, as indicated at 804, the current time is added as the replaced time 306 in the immediately preceding entry 708 for the seventh version of file 1 (file 1, v7). Furthermore, as indicated at 806, the weekly flag 310 is cleared for the immediately previous entry 708 since the eighth version of file 1 (file 1, v8) is stored during the same week as the seventh version of file 1 (file 1, v7) corresponding to the earlier entry 708. However, as indicated at 806 and 808, respectively, the daily flag 308 and the monthly flag 312 are not cleared since the eighth version of file 1 (file 1, v8) is stored on a different day and different month from the seventh version of file 1 (file 1, v7).

In addition, the restore point module may create a new entry 810 in the restore point data structure 124 for the third version of file 2 (file 2, v3). Accordingly, the entry 810 includes the object ID 302 for file 2, v3, the timestamp 304, which is the current time, and the daily flag 308, weekly flag 310, and monthly flag 312 are all set to true. In addition, as indicated at 812, the current time is added as the replaced time 306 in the immediately preceding entry 402 for the second version of file 2 (file 2, v2). However, none of the flags are cleared for the daily flag 308, weekly flag 310, or monthly flag 312 in entry 402 since the third version of file 2 is saved during a different day, different week and different month from the second version of file 2.

FIG. 9 illustrates an example table 900 showing the earliest daily weekly and monthly restore points according to some implementations. For instance, in this example, daily restore points are provided for the past 7 days, as indicated at 902; weekly restore points are provided for the last 4 weeks, as indicated at 904; and monthly restore points are provided for the last 12 months, as indicated at 906. Furthermore, as mentioned above, the data set in this example was established on Thursday, Jan. 15, 2015, at 9 AM. Accordingly, the earliest daily restore point date 908 is this date, the earliest weekly restore point date 910 is this date, and the earliest monthly restore point date 9912 is this date.

At any point in time, asynchronously from adding or removing versions of files from the data set, the restore point module may periodically clear milestone flag(s) from entries in the restore point data structure 124 based on the configured values 902-906 for how long to make restore points available. Based on clearing these milestone flags from the entries, the restore point module may update the earliest available milestone restore point date(s), as discussed additionally below with respect to FIGS. 10 and 11.

Figure 10:
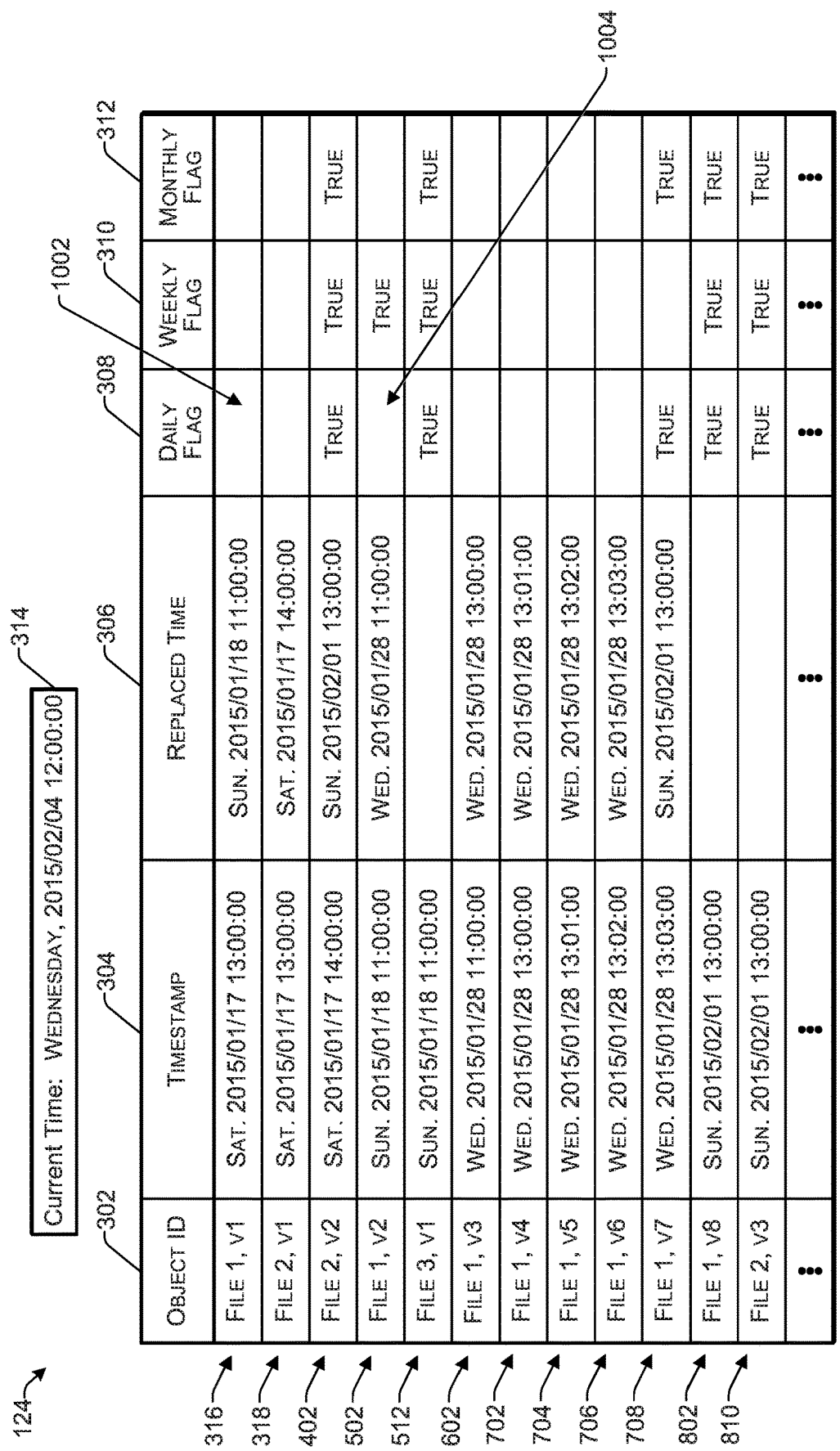
FIG. 10 illustrates the example restore point data structure at a subsequent point in time according to some implementations.

FIG. 10 illustrates the example restore point data structure 124 at a subsequent point in time according to some implementations. In this example, suppose that the current time is Wednesday Feb. 4, 2015, at 12:00 PM. Further, suppose that the restore point module is running a process to clear from the restore point data structure of entries flags of milestone versions that have expired due to the passage of time. Accordingly, referring back to the configuration of the restore point data structure 124 as shown in FIG. 8, the restore point module may attempt to clear the daily, weekly, and/or monthly flags where appropriate based on the configured settings 902-906 discussed above with respect to FIG. 9. Thus, the restore point module starts processing of the restore point data structure 124 as shown in FIG. 8 to determine whether any flags may be cleared. For instance, the data set is configured for supporting daily restore points for 7 days. Consequently, any entries with a replaced time earlier than 7 days ago from the current time may have the daily flag cleared.

Referring to the example of FIG. 10, the current time is February 4, and seven days earlier than the current time is January 28. Accordingly, any entries having a replaced time earlier than Wednesday, Jan. 28, 2015 at 12:00 PM may have the daily flag cleared. As indicated at 1002 and 1004, there are two daily flags that can be cleared based on this criteria. In particular, entry 316 has a replaced time 306 of Jan. 18, 2015, which is more than seven days from the current time. In addition, entry 502 has a replaced time of Jan. 28, 2015, at 11:00 AM, which is seven days and one hour earlier than the current time.

Furthermore, as discussed above, the system may be configured to keep weekly versions for 4 weeks. Accordingly, any entries with a replaced time 306 earlier than Wednesday, Jan. 7, 2015, at 12:00 PM may have the weekly flag cleared. In this example, there are no such entries. In addition, the system is configured to keep monthly versions for 12 months, and any entries with a replaced time earlier than Wednesday, Feb. 4, 2014, at 12 PM may have the monthly flag cleared. In this example, there are no such entries.

FIG. 11 illustrates the updated example table 900 showing the earliest daily weekly and monthly milestone restore points according to some implementations. Based on the two daily flags being cleared, as discussed above with respect to FIG. 10, the table 900 is updated at 908 to show that the earliest available daily restore point date is now Wednesday, Jan. 28, 2015, at 12:00 PM. The earliest weekly restore point date 910 and the earliest monthly restore point date 912 remain unchanged. Furthermore, if the configurable values for daily retention 902, weekly retention 904, and monthly retention 906 are changed to be shorter, then this may result in the restore point module removing additional flags from the restore point data structure 124 and thereby removing additional entries.

Figure 12:
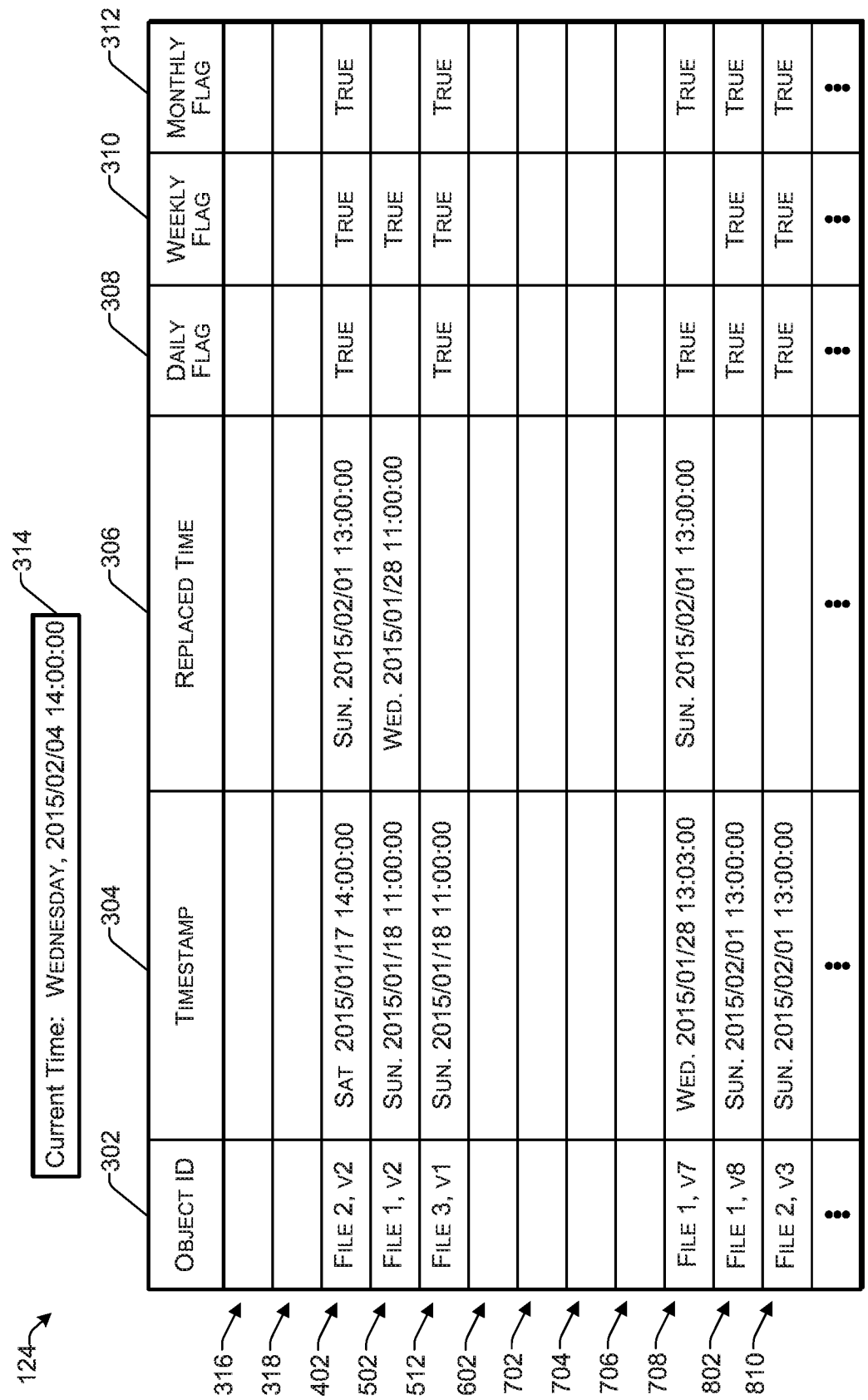
FIG. 12 illustrates the example restore point data structure according to some implementations.

FIG. 12 illustrates the example restore point data structure 124 at a subsequent point in time according to some implementations. In this example, the restore point module has pruned the restore point data structure 124 of FIG. 10 to remove any entries that are no longer needed for providing restore points to a user. Thus, the restore point module may asynchronously remove entries that have no milestone flags 308-312 set since the entries in the restore point data structure 124 that do not have any flag set (i.e., the daily, weekly, and monthly flags have been cleared) are not used for any restore points there is no need to retain the metadata for these entries and no need to retain the corresponding files themselves in the storage system. Accordingly, in FIG. 12, suppose that the current time is now Wednesday Feb. 4, 2015, at 2:00 PM i.e., 1400 hours. Furthermore, suppose that following the clearing of the flags as discussed above with respect to FIG. 10, the restore point module is now pruning the restore point data structure to remove entries that are no longer of use.

To perform this function, the restore point module may merely traverse the restore point data structure 124 to locate any entries that have had all of the daily flag 308, weekly flag 310, and monthly flag 312 cleared. Alternatively, the restore point module may use database indexes to make the operation faster than a brute force traversal of all the data in the data structure 124. In this example, entries 316, 318, 602, 702, 704, and 706 meet the criteria of having all three flags cleared. Accordingly, these entries may be cleared or otherwise deleted from the restore point data structure 124. In addition, the restore point module may send, to the storage system, an indication that the objects corresponding to these entries may be permanently deleted from the storage system. Accordingly, the storage system may subsequently delete the identified objects in due course based on the storage system's own object deletion processing. Consequently, implementations herein enable prompt deletion of unnecessary files or other objects from the storage system thereby conserving storage capacity and avoiding unnecessary waste of storage space for maintaining unneeded object versions.

Figure 13:
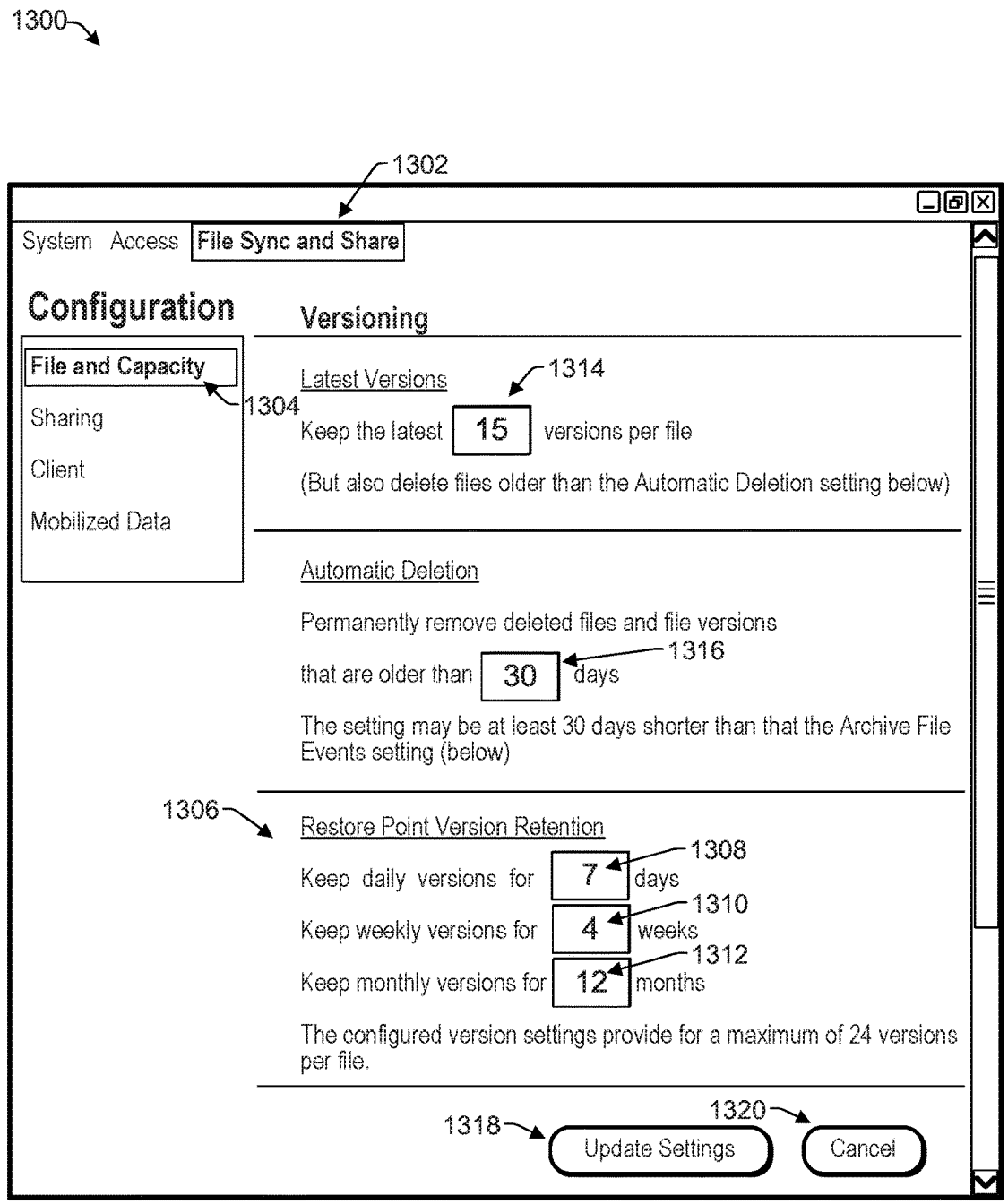
FIG. 13 illustrates an example user interface for setting restore point retention periods according to some implementations.

FIG. 13 illustrates an example user interface 1300 able to be used for setting restore point retention periods according to some implementations. For instance, the user interface 1300 may be presented on a display of a device of an administrator or other user having sufficient permission status for setting the retention periods. In this example, to configure the retention periods, the user has selected the file sync and share setting, as indicated at 1302, and has selected "file and capacity" at 1304 for controlling the configuration settings.

As indicated at 1306, the user interface 1300 enables the user to set the restore point version retention periods. For instance, as indicated at 1308 the user may set the number of days to keep daily versions; as indicated at 1310 the user may set the number of weeks to keep weekly versions; and as indicated at 1312, the user may set the number of months to keep monthly versions. In some examples, the settings may apply to a particular user or particular folders or filesystems associated with a particular user or multiple users. In other examples, the settings may apply across the system to all users of the system.

Further, the restore point intervals and retention periods may be configured based on various different levels of granularity, such as for particular users, a group of file systems, a group of folders, a particular file system, a particular folder, a group of objects, a particular object, or the like. For instance, if the restore point intervals or retention periods are changed for a particular folder, the corresponding restore point data structure may be updated accordingly. As one example, suppose that a user's private folder includes one or more files stored according to a first set of restore point intervals and retention periods. Subsequently, suppose that the folder is transitioned to become a team folder, and that a different set of restore point intervals and/or retention periods apply to team folders. Accordingly, the restore point data structure for the folder may be updated to correspond to the newly applicable restore point intervals and retention periods. In some cases, the restore point module may be executed to clear additional flags based on a shortening of the retention period.

In addition, in this example the user may also set the number of versions to keep per file and the number of days at which automatic deletion of files is applied. For instance, as indicated at 1314, in this example, the user has indicated that the latest 15 versions of a file may be retained. However, this setting may be overridden by the automatic deletion setting and the restore point version retention periods set at 1306. For example, even if the latest 15 versions of a file are retained additional older versions of the file that correspond to restore point milestone versions are not deleted until all corresponding flags are cleared, as discussed above with respect to FIG. 10. Furthermore, in this example, as indicated at 1316, the user may specify that deleted file and file versions that are older than 30 days may be permanently removed from the storage system. Accordingly when a file is marked for deletion, the file may not be immediately deleted from the storage system, but instead may be retained for 30 days and then subsequently deleted thereafter. When the user has finished configuring the settings in the user interface 1300, the user may select an update settings button 1318 to have the settings take effect in the system. Further, a cancel button 1320 may be provided to be used if the user decides not to change any settings.

Figure 14:
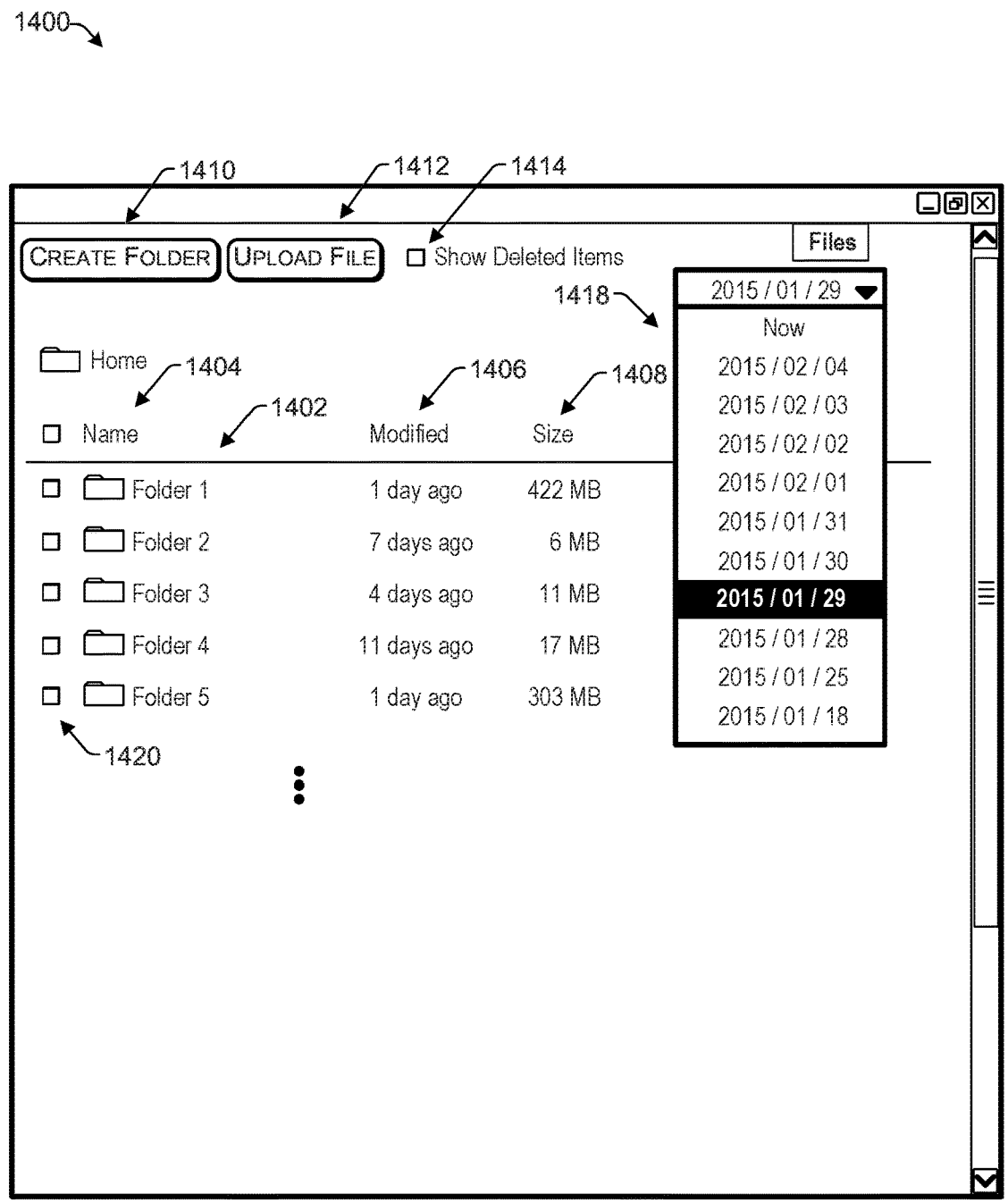
FIG. 14 illustrates an example user interface for accessing a restore point object version according to some implementations.

FIG. 14 illustrates an example user interface 1400 for accessing a restore point according to some implementations. For instance, a user device or other client device may receive information from the service computing device, such as for presenting a webpage or other user interface. As one example, the webpage may include the user interface 1400 presented, on a display of a user device. In this case, the user may be able to view a listing 1402 of folders owned by the particular user that are available for a selected restore point. The user interface 1400 may further include information about the user's folders such as folder name 1404, when each folder was last modified 1406, and the storage size 1408. In addition, the user interface 1400 may include various other controls such as a control 1410 for creating a new folder, a control 1412 for uploading a file, a control 1414 for showing deleted items, and so forth.

In this example, the user may select a drop-down menu 1418 to view a list of available restore points. The user may select a particular restore point in the drop-down menu 1418 to view the user data corresponding to the selected restore point. In this example, suppose that the current date is Feb. 5, 2015, and that the available restore points listed in the drop-down menu 1418 may be obtained from the restore point data structure 124, as illustrated in FIG. 12, which was pruned a day earlier, as well as other restore point data structures corresponding to other files, objects, folders, etc., not shown in the examples herein for clarity of explanation. Thus, the list of restore point dates may be constructed for milestone restore point intervals by including all dates which: (1) are later than the earliest available restore point date for the milestone interval; (2) are earlier than the current interval (e.g., not today if using daily intervals); and (3) fall on the interval period.

In the example of FIG. 12, the latest available restore point dates were last updated on Feb. 4, 2015. Thus, the restore points that would be available on Feb. 5, 2015, are as follows:

Daily versions: later than Jan. 28, 2015 at 12:00 PM, and earlier than the current day (Feb. 5, 2015), and at the end of every day. This results in daily restore points shown below. All restore points are for the end of the date specified.

Jan. 28, 2015
Jan. 29, 2015
Jan. 30, 2015
Jan. 31, 2015
Feb. 1, 2015
Feb. 2, 2015
Feb. 3, 2015
Feb. 4, 2015

Weekly versions: Later than Jan. 15, 2015 at 9:00 AM, earlier than today (Feb. 5, 2015), and at the end of every week. This results in weekly restore points shown below. All restore points are for the end of the date specified.

Sunday, Jan. 18, 2015
Sunday, Jan. 25, 2015
Sunday, Feb. 1, 2015

Monthly versions: Later than Jan. 15, 2015 at 9:00 AM, earlier than today (Feb. 5, 2015), and on the last day of the month. This results in the following monthly restore points shown below. All restore points are for the end of the date specified.

Saturday, Jan. 31, 2105

As stated above, selecting the objects in a restore point may be performed by selecting those objects that were created before the restore point date, and either not replaced at all or replaced after the restore point time. Based on the above-listed available restore points on Feb. 5, 2015, the drop-down menu 1418 may be compiled.

In the illustrated example, suppose that the user selects restore point date Jan. 29, 2015. Then, referring to the restore point data structure in FIG. 12, the objects in the selected restore point are determined by selecting the entries in which the timestamp 304 is earlier than Jan. 30, 2015, at 12:00 AM, i.e., 00:00 hours and in which the replaced time 306 is null or is greater than or equal to Jan. 30, 2015 at 12:00 AM.

This results in selection of entries 402, 512, and 708, which correspond to file 2, v2, file 3, v1, and file 1, v7, respectively. As an example, suppose that these files are contained in folder 5 for the selected restore point date of Jan. 29, 2015. Furthermore, suppose that the user has other data, which includes folders 1-4, which are also available for the selected restore point date. Accordingly, rather than download all of the content of all of the user's data for the restore point, the user may select a check box 1420 adjacent to a desired folder, and may download the content of the selected folder. Thus, by downloading the content of folder 5, the user is able to access the versions of file 1, file 2 and file 3 as they existed on the restore point date of Jan. 29, 2015. Further, if the user wanted to download the content of all the data corresponding to the selected restore point, the user can check all of the check boxes 1420. In some cases, the data may be placed in a zip file, compressed, or the like, prior to sending to the client device.

Further, the number of object versions stored in implementations herein is substantially less than the number of dates for which restore points are available. For example, the dropdown menu lists restore points available for 10 dates for the three objects, which if a conventional snapshot copying technique were employed would require 10 copies of each file (i.e., 30 total copies stored on the storage). However, the restore point data structure of FIG. 12 shows that there are only 6 objects stored on the storage to provide the restore points for the three files for the 10 listed dates, and no data was copied to provide the restore points.

FIGS. 15-18 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 15:
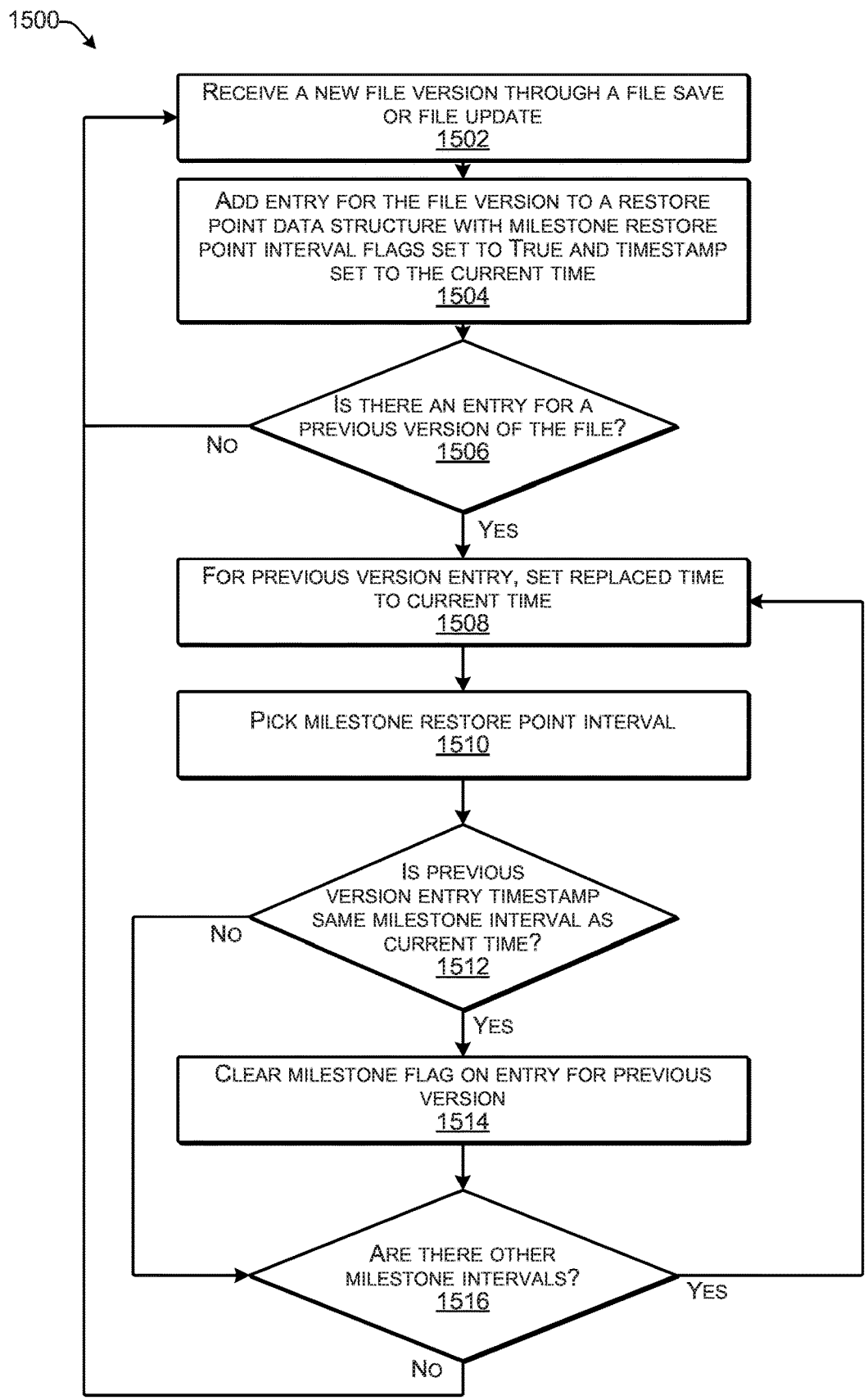
FIG. 15 is a flow diagram illustrating an example process when a file is added or updated according to some implementations.

FIG. 15 is a flow diagram illustrating an example process 1500 executed for enabling restore points according to some implementations. In some examples, the process 1500 may be executed by the service computing device 102 or other suitable computing device.

At 1502, the computing device may receive a file save or file update from a user computing device. For example, a user or an application on a user device may upload a file to be stored on the storage system or may make a change to a file stored on the storage system.

At 1504, the computing device may add a new entry to the restore point data structure for the new file version. When adding the new entry, the timestamp for the entry is set equal to the current time and the milestone version flags (e.g., daily milestone, weekly milestone, and/or monthly milestone) are set to true.

At 1506, the computing device may determine whether there is an entry in the restore point data structure for a previous version of the file. If not, the process returns to block 1502 to wait for a next action. If so, the process proceeds to block 1508.

At 1508, for the previous version entry, the computing device may set the replaced time to the current time.

At 1510, the computing device may select one of the milestone intervals, e.g., daily milestone, weekly milestone, and or monthly milestone.

At 1512, the computing device may determine whether there is a previous version entry timestamp for the same restore point interval milestone as the current time interval. For example, the computing device determines whether there is a previous version of file. If so, and if the daily milestone restore point interval is selected, then the computing device determines whether there the timestamp for the previous version is for the same day. Similarly, if the weekly milestone restore point interval is selected, the computing device determines whether the timestamp for the previous version is for the same week. Additionally, if the monthly milestone restore point interval is selected, the computing device determines whether the timestamp for the previous version is for the same month.

At 1514, if the entry for the previous version of the file includes a timestamp for the same restore point time interval, the computing device clears the milestone restore point interval flag on the entry for the previous version of the file.

At 1516, the computing device determines whether there are other milestone restore point intervals that have not yet been examined. If so, the process returns to block 1508 to select the next milestone restore point interval. If not, the process returns to block 1502 to wait for a next user action.

Figure 16:
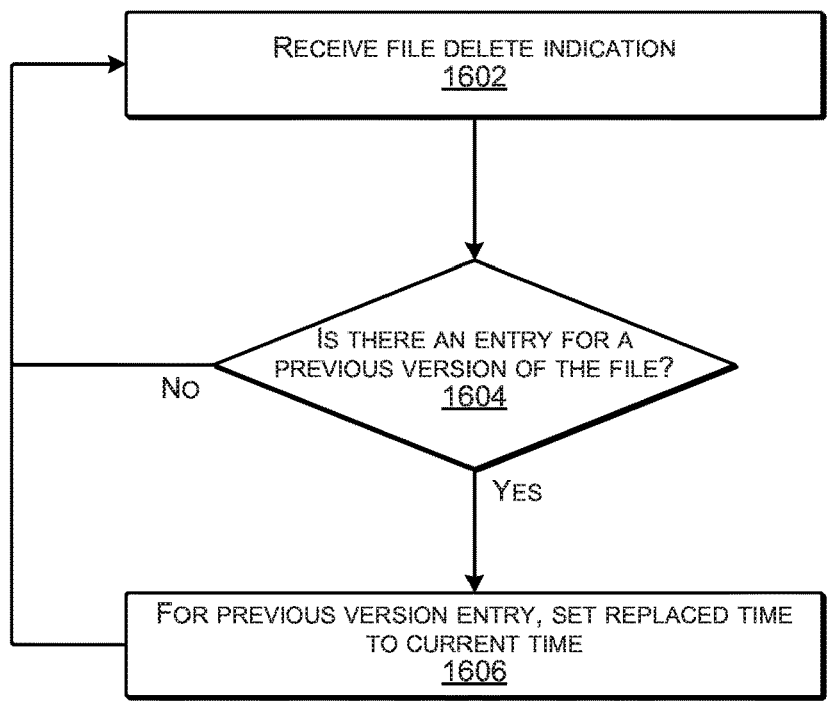
FIG. 16 is a flow diagram illustrating an example process when a file is deleted according to some implementations.

FIG. 16 is a flow diagram illustrating an example process 1600 executed when a user deletes a file according to some implementations. In some examples, the process 1600 may be executed by the service computing device 102 or other suitable computing device.

At 1602, the computing device receives an indication from a user that a file is to be deleted. For example, a user or an application may send an indication that a particular file is to be deleted from the storage system.

At 1604, the computing device determines whether there is an entry for a previous version of the file. For example, the computing device may access the restore point data structure to determine any previous versions of the file that may be associated with a restore point.

At 1606, for the most recent previous version entry, the computing device may set the replaced time to the current time. Setting the replaced time to the current time without adding any new version of the file will cause the flags for the deleted file to be cleared eventually as the milestone intervals age out according to the configured retention periods. When all the milestone flags have been cleared, the entry for the deleted file is removed from the restore point data structure, and an indication is sent to the storage system to permanently delete the corresponding file from the storage system according to the storage system's deletion processing.

Figure 17:
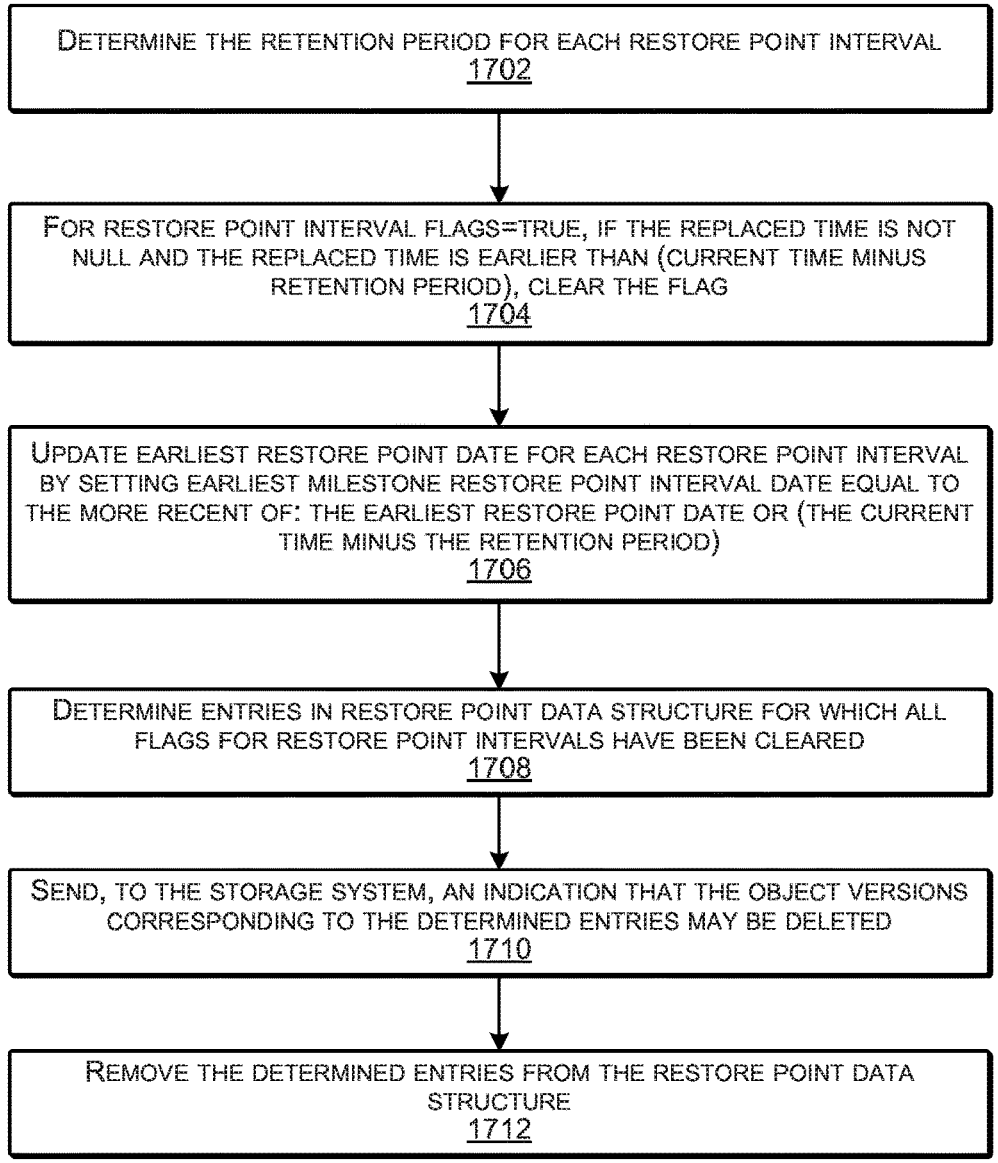
FIG. 17 is a flow diagram illustrating an example process for determining object versions that are no longer used as restore points according to some implementations.

FIG. 17 is a flow diagram illustrating an example process 1700 for determining object versions that are no longer being used for restore points according to some implementations. In some cases, the process 1700 may be executed by the service computing device 102 or other suitable computing device.

At 1702, the computing device may determine a retention period for each restore point interval.

At 1704, for restore point interval flags that are set to true, if the replaced time is not null and the replaced time is earlier than the current time minus retention period the computing device may clear the flag.

At 1706, the computing device may update the earliest restore point date for each restore point interval by setting the earliest milestone restore point interval date equal to the more recent of: the earliest restore point date; or the current time minus the retention period for the particular restore point interval.

At 1708, the computing device may determine entries in restore point data structure for which all flags for restore point intervals have been cleared. For example, the restore point module may periodically run a process to prune the restore point data structure of aged-out entries, and further delete from the storage system object versions that are no longer being used as restore points. Thus, if all the flags are cleared, the corresponding object version is no longer serving as a restore point, and may be permanently deleted from the storage system.

At 1710, the computing device may send, to the storage system, an indication that the object versions corresponding to the determined entries may be deleted. For instance, the storage system may periodically delete objects that are to be permanently deleted based on a deletion policy used by the storage system.

At 1712, the computing device may remove the determined entries from the restore point data structure. For example, the restore point module may clear aged-out entries from the data structure to keep the data structure size from continually growing.

Figure 18:
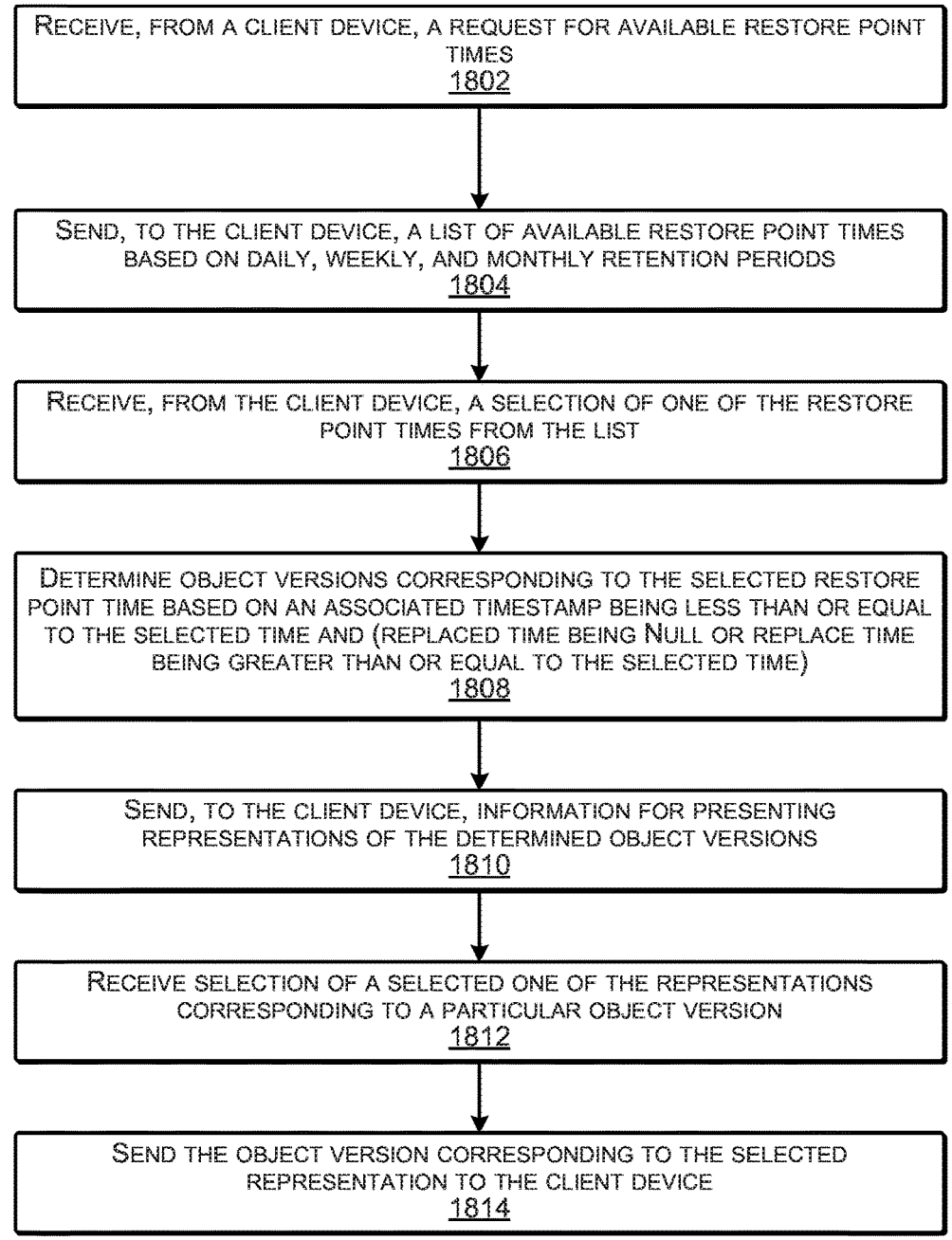
FIG. 18 is a flow diagram illustrating an example process for providing a restore point object version to a client device according to some implementations.

FIG. 18 is a flow diagram illustrating an example process 1800 for providing a restore point object to a user according to some implementations. In some cases, the process 1800 may be executed by the service computing device 102 or other suitable computing device.

At 1802, the computing device may receive, from a client device, a request for available restore point times. In some examples, as discussed above with respect to FIG. 14, the request may be made via a user interface and may relate to some or all of the data to which the user has access, such as in a private file system associated with the user, a group of file systems, a group of folders, a particular file system, a particular folder, a group of objects, or a particular object. In some cases, the user interface may be presented to the user in a web browser or other application that executes on the client device. For example, the user may use the application to log in to the server module and may be presented with the user interface as a series of webpages or the like. Further, other types of user interfaces may be used in other examples, and implementations herein are not limited to web-based examples.

At 1804, the computing device may send, to the client device, a list of available restore point times based on daily, weekly, and monthly retention periods. For example, the list may be determined by determining a first retention period for the daily restore point interval, a second retention period for the weekly restore point interval, and a third retention period for the monthly restore point interval. The computing device may further determine an earliest restore point date for the daily restore point interval based on the most recent of: an earliest restore point date for the selected file system, etc., or the current date minus the first retention period. The computing device may determine an earliest restore point date for the weekly restore point interval based on the most recent of: an earliest restore point date for the selected file system, etc., or the current date minus the second retention period. The computing device may determine an earliest restore point date for the monthly restore point interval based on the most recent of: an earliest restore point date for the selected file system, etc., or the current date minus the third retention period. The computing device may then determine the list of available restore point dates based on the earliest restore point date for the daily restore point interval, the earliest restore point date for the weekly restore point interval; and the earliest restore point date for the monthly interval. The list may then be sent to the client device.

At 1806, the computing device may receive, from the client device, a selection of one of the restore point times selected from the list. For example, the user may select the restore point time via a user interface, such as the example user interface illustrated in FIG. 14.

At 1808, the computing device may determine one or more object versions corresponding to the selected restore point time based on an associated timestamp being less than or equal to the selected time and further based on one of: the associated replaced time being null, or the associated replace time being greater than or equal to (e.g., more recent than) the selected restore point time.

At 1810, the computing device may send, to the client device, information related to the one or more object versions, such as information for presenting respective representations of the determined one or more object versions.

At 1812, the computing device may receive a selection of a selected one or more of the representations corresponding to a particular object version.

At 1814, the computing device may send content of the selected object version to the client device. Alternatively, the computing device may send the content of the object version to the client device at block 1810. For example, if there is only a small amount of data associated with a selected restore point date, the object content may be sent to the client device along with the information related to the object(s) available for the selected restore point.

Accordingly, implementations herein may provide data restore points for multiple different restore point interval types, such as daily, weekly, monthly, etc. A computing device may receive, at a first time, a first version of an object for storage in a storage system. The computing device may store, in a first entry in a data structure, a first timestamp corresponding to the first time, a first flag for a daily interval, a first flag for a weekly interval, and a first flag for a monthly interval. The computing device may receive, at a second time, a second version of the object for storage in the storage system. The computing device may store, in a second entry in the data structure, a second timestamp corresponding to the second time, a second flag for the daily interval, a second flag for the weekly interval, and a second flag for the monthly interval. The computing device may store, in the first entry in the data structure, the second time as a replaced time. If the second time is within the same day as the first time, the computing device may clear the first flag for the daily interval. If the second time is within the same week as the first time, the computing device may clear the first flag for the weekly interval. If the second time is within the same month as the first time, the computing device may clear the first flag for the monthly interval. The computing device may receive, from a client device, a restore point time, and may determine an object version corresponding to the selected restore point time based on an associated timestamp being less than or equal to the selected time and further based on one of: the replaced time being null, or the replaced time being greater than or equal to the selected time. The computing device may send at least one of information about the object version or the object version to the client device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system providing at least a first restore point interval, the system comprising:
   a storage; and
   one or more processors coupled for communication with the storage, the one or more processors programmed by executable instructions to perform operations comprising:
   receiving, at a first time, a first version of an object for storing in the storage;
   storing, in association with the first version of the object, a first timestamp corresponding to the first time and a first flag for the first restore point interval;
   receiving, at a second time, a second version of the object for storing in the storage;
   storing, in association with the second version of the object, a second timestamp corresponding to the second time and a second flag for the first restore point interval;
   based at least in part on determining that the second time and the first time are within a same time interval corresponding to the first restore point interval, clearing the first flag for the first restore point interval;
   determining an object version for which the first interval flag for the first restore point interval has been cleared;
   sending an indication that the determined object version is to be deleted from the storage;
   storing, in association with the first version of the object, the second time as a replaced time;
   receiving, from a client device, an indication of a restore point time;

determining an object version corresponding to the
restore point time based on the associated timestamp
being less than or equal to the selected time, and
further based on one of:
an associated replaced time being null; or
the associated replaced time being greater than or
equal to the restore point time; and
sending, to the client device, at least one of:
information about the determined object version; or
content of the determined object version.

2. The system as recited in claim 1, the operations further comprising:
prior to receiving the restore point time from the client device, receiving from the client device a request for available restore point times;
sending, to the client device, information to enable the client device to present a user interface including a list of available restore point times; and
receiving, from the client device, a selection of one of the restore point times as the restore point time.

3. The system as recited in claim 2, the operations further comprising determining the list of available restore point times by:
determining a first retention period for the first restore point interval;
determining an earliest restore point date for the first restore point interval based on a most recent of:
an earliest restore point date for the selected file system; or
a current date minus the first retention period; and
determining the list of available restore point dates based on the earliest restore point date for the first restore point interval.

4. The system as recited in claim 1, further comprising a data structure, wherein there are multiple restore point intervals, including a daily restore point interval, a weekly restore point interval, and a monthly restore point interval, the operations further comprising:
storing, in a first entry in a data structure, the first timestamp, a replaced time corresponding to the second time, a first flag for the daily interval, a first flag for the weekly interval, and a first flag for the monthly interval;
storing, in a second entry in the data structure, the second timestamp, a second flag for the daily interval, a second flag for the weekly interval, and a second flag for the monthly interval;
if the second time is within the same day as the first time, clearing the first flag for the daily interval;
if the second time is within a same week as the first time, clearing the first flag for the weekly interval;
if the second time is within a same month as the first time, clearing the first flag for the monthly interval;
determining an entry in the data structure for which the daily interval flag, the weekly interval flag, and the monthly interval flag have been cleared;
sending an indication that an object version corresponding to the determined entry is to be deleted from the storage; and
removing the determined entry from the data structure.

5. The system as recited in claim 1, wherein there are at least the first restore point interval and a second restore point interval, wherein the second restore point interval is based on a different time interval than the first restore point interval, the operations further comprising:
storing, in association with the first version of the object, a first flag for the second restore point interval;
storing, in association with the second version of the object, a second flag for the second restore point interval;
based at least in part on determining that the second time and the first time are within a same time interval corresponding to the second restore point interval, clearing the first flag for the second restore point interval; and
determining an object version for which both the first flag for the first restore point interval and the first flag for the second restore point interval have been cleared.

6. The system as recited in claim 5, the operations further comprising periodically checking for flags to be cleared by:
determining a first retention period for the first restore point interval and a second retention period for the second restore point interval;
for flags associated with the first restore point interval, if the replaced time associated with the object version is not null, and the replaced time is earlier than a current time minus the first retention period, a respective flag is cleared; and
for flags associated with the second restore point interval, if the replaced time associated with the object version is not null, and the replaced time is earlier than a current time minus the second retention period, a respective flag is cleared.

7. The system as recited in claim 6, the operations further comprising:
determining a change in at least one of a first retention period for the first restore point interval or a second retention period for the second restore point interval; and
checking the flags based on the changed retention period.

8. The system as recited in claim 7, wherein the change in at least one of the first retention period or the second retention period is caused at least in part by at least one of:
changing a type of a folder containing the object from a private folder to a shared folder or team folder, or vice versa; or
changing, by a user, retention period settings of a folder or file system containing the object.

9. The system as recited in claim 7, wherein:
the first restore point interval is a daily restore point interval;
the second restore point interval is one of a weekly restore point interval or a monthly restore point interval;
the first retention period is a number of daily restore points to retain; and
the second retention period is a number of weekly restore points to retain for the weekly restore point interval, or a number of monthly restore points to retain for the monthly restore point interval.

10. The system as recited in claim 5, the operations further comprising:
providing information to enable presentation of a user interface having a plurality of different restore point intervals and a configurable retention period for at least one of the restore point intervals; and
receiving, via the user interface, a selection of a first retention period for the first restore point interval and a selection of a second retention period for the second restore point interval.

11. A method providing at least a first restore point interval, the method comprising:
receiving, at a first time, a first version of an object for storing in the storage;

storing, in association with the first version of the object, a first timestamp corresponding to the first time and a first flag for the first restore point interval;
receiving, at a second time, a second version of the object for storing in the storage;
storing, in association with the second version of the object, a second timestamp corresponding to the second time and a second flag for the first restore point interval;
based at least in part on determining that the second time and the first time are within a same time interval corresponding to the first restore point interval, clearing the first flag for the first restore point interval;
determining an object version for which the first flag for the first restore point interval has been cleared; and
sending an indication that the determined object version is to be deleted from the storage;
wherein there are at least the first restore point interval and a second restore point interval, wherein the second restore point interval is based on a different time interval than the first restore point interval, the method further comprising:
storing, in association with the first version of the object, a first flag for the second restore point interval;
storing, in association with the second version of the object, a second flag for the second restore point interval;
based at least in part on determining that the second time and the first time are within a same time interval corresponding to the second restore point interval, clearing the first flag for the second restore point interval; and
determining an object version for which both the first flag for the first restore point interval and the first flag for the second restore point interval have been cleared.

12. The method as recited in claim 11, storing, in association with the first version of the object, a replaced time corresponding to the second time;
receiving, from a client device, an indication of a restore point time;
determining an object version corresponding to the selected restore point time based on the associated timestamp being less than or equal to the selected time, and further based on one of:
an associated replaced time being null; or
the associated replaced time being greater than or equal to the selected restore point time; and
sending, to the client device, at least one of:
information about the determined object version; or
content of the determined object version.

13. The method as recited in claim 11, further comprising periodically checking for flags to be cleared by:
determining a first retention period for the first restore point interval and a second retention period for the second restore point interval;
for flags associated with the first restore point interval, if the replaced time associated with the object version is not null, and the replaced time is earlier than a current time minus the first retention period, clear a respective flag; and
for flags associated with the second restore point interval, if the replaced time associated with the object version is not null, and the replaced time is earlier than a current time minus the second retention period, clear a respective flag.

14. One or more non-transitory computer-readable media storing instructions that, when executed by one or more processors, program the one or more processors to:
receive, at a first time, a first version of an object for storing in the storage;
store, in association with the first version of the object, a first timestamp corresponding to the first time and a first flag for a first restore point interval;
receive, at a second time, a second version of the object for storing in the storage;
store, in association with the second version of the object, a second timestamp corresponding to the second time and a second flag for the first restore point interval;
based at least in part on determining that the second time and the first time are within a same time interval corresponding to the first restore point interval, clear the first flag for the first restore point interval;
determine an object version for which the first interval flag for the first restore point interval has been cleared;
send an indication that the determined object version is to be deleted from the storage;
wherein there are at least a first restore point interval and a second restore point interval, wherein the second restore point interval is based on a different time interval than the first restore point interval, wherein the one or more processors are further programmed to:
store, in association with the first version of the object, a first flag for the second restore point interval;
store, in association with the second version of the object, a second flag for the second restore point interval;
based at least in part on determining that the second time and the first time are within the same time interval corresponding to the second restore point interval, clear the first flag for the second restore point interval;
determining an object version for which both the first flag for the first restore point interval and the first flag for the second restore point interval have been cleared; and
store, in association with the first version of the object, a replaced time corresponding to the second time.

15. The one or more non-transitory computer-readable media as recited in claim 14, wherein the one or more processors are further programmed to:
receive, from a client device, a restore point time;
determine an object version corresponding to the selected restore point time based on the associated timestamp being less than or equal to the selected time, and further based on one of:
an associated replaced time being null; or
the associated replaced time being greater than or equal to the selected restore point time; and
send, to the client device, at least one of:
information about the determined object version; or
content of the determined object version.

16. The one or more non-transitory computer-readable media as recited in claim 14, wherein the one or more processors are further programmed to periodically checking for flags to be cleared by:
determining a first retention period for the first restore point interval and a second retention period for the second restore point interval;
for flags associated with the first restore point interval, if the replaced time associated with the object version is not null, and the replaced time is earlier than a current time minus the first retention period, clear a respective flag; and
for flags associated with the second restore point interval, if the replaced time associated with the object version is not null, and the replaced time is earlier than a current time minus the second retention period, clear a respective flag.

17. The one or more non-transitory computer-readable media as recited in claim 16, wherein the one or more processors are further programmed to:
  determine a change in at least one of a first retention period for the first restore point interval or a second retention period for the second restore point interval; and
  check the flags based on the changed retention period.

18. The one or more non-transitory computer-readable media as recited in claim 17, wherein the change in at least one of the first retention period or the second retention period is caused at least in part by at least one of:
  changing a type of a folder containing the object from a private folder to a shared folder or team folder, or vice versa; or
  changing, by a user, retention period settings of a folder or file system containing the object.

19. The one or more non-transitory computer-readable media as recited in claim 17, wherein:
  the first restore point interval is a daily restore point interval;
  the second restore point interval is one of a weekly restore point interval or a monthly restore point interval;
  the first retention period is a number of daily restore points to retain; and
  the second retention period is a number of weekly restore points to retain for the weekly restore point interval, or a number of monthly restore points to retain for the monthly restore point interval.

20. The one or more non-transitory computer-readable media as recited in claim 14, wherein the one or more processors are further programmed to:
  provide information to enable presentation of a user interface having a plurality of different restore point intervals and a configurable retention period for at least one of the restore point intervals; and
  receive, via the user interface, a selection of a first retention period for the first restore point interval and a selection of a second retention period for the second restore point interval.

* * * * *